(12) United States Patent
Schwagmann et al.

(10) Patent No.: US 8,428,634 B2
(45) Date of Patent: Apr. 23, 2013

(54) METHOD FOR AUTOMATICALLY SETTING UP AND/OR CONTROLLING A TELECOMMUNICATION CONFERENCE

(75) Inventors: Norbert Schwagmann, Lehe (DE); Andreas Schmidt, Braunschweig (DE); Holger Schmidt, Braunschweig (DE); Marcus Benthin, Hildesheim (DE)

(73) Assignee: Intel Mobile Communications GmbH, Neubiberg (DE)

( * ) Notice: Subject to any disclaimer, the term of this patent is extended or adjusted under 35 U.S.C. 154(b) by 626 days.

(21) Appl. No.: 11/264,679

(22) Filed: Oct. 31, 2005

(65) Prior Publication Data

US 2007/0097886 A1    May 3, 2007

(30) Foreign Application Priority Data

Nov. 5, 2004    (DE) .......................... 10 2004 053 597

(51) Int. Cl.
*H04B 7/00* (2006.01)
(52) U.S. Cl.
USPC .......................... 455/518; 370/260; 370/329
(58) Field of Classification Search .................. 455/518; 370/260, 329
See application file for complete search history.

(56) References Cited

U.S. PATENT DOCUMENTS

| | | | | |
|---|---|---|---|---|
| 3,527,889 A * | 9/1970 | Nennerfelt | ............... | 379/204.01 |
| 4,614,843 A * | 9/1986 | Coulmance | .................. | 379/352 |
| 5,867,822 A * | 2/1999 | Sankar | ............... | 705/8 |
| 5,910,545 A * | 6/1999 | Tsai et al. | ...................... | 525/178 |
| 6,163,692 A * | 12/2000 | Chakrabarti et al. | ......... | 455/416 |
| 6,194,483 B1 * | 2/2001 | Tsai et al. | ...................... | 523/105 |
| 6,314,176 B1 * | 11/2001 | Gunasekar | ............... | 379/265.01 |
| 6,343,314 B1 * | 1/2002 | Ludwig et al. | ................ | 709/204 |
| 6,477,366 B1 * | 11/2002 | Valentine et al. | ............. | 455/416 |
| 6,499,053 B1 * | 12/2002 | Marquette et al. | ............ | 709/204 |
| 6,594,269 B1 * | 7/2003 | Polcyn | ......................... | 370/401 |
| 6,604,129 B2 * | 8/2003 | Slutsman et al. | ............. | 709/204 |
| 6,633,910 B1 * | 10/2003 | Rajan et al. | ................... | 709/224 |
| 6,650,745 B1 * | 11/2003 | Bauer et al. | ............. | 379/202.01 |
| 6,732,103 B1 * | 5/2004 | Strick et al. | ........................... | 1/1 |
| 6,732,177 B1 * | 5/2004 | Roy | .............................. | 709/227 |
| 6,775,255 B1 * | 8/2004 | Roy | ............................. | 370/331 |
| 6,795,108 B2 * | 9/2004 | Jarboe et al. | ............... | 348/14.09 |
| 6,819,247 B2 * | 11/2004 | Birnbach et al. | ........... | 340/573.1 |
| 6,859,448 B1 * | 2/2005 | Roy | ............................. | 370/338 |
| 6,937,593 B1 * | 8/2005 | Gunasekar et al. | ........... | 370/352 |
| 6,947,724 B2 * | 9/2005 | Chaney | ......................... | 455/408 |
| 6,965,883 B2 * | 11/2005 | Xu et al. | ....................... | 705/418 |

(Continued)

FOREIGN PATENT DOCUMENTS

WO    WO-03/049459 A1    6/2003

OTHER PUBLICATIONS

Push-To-Talk over Cellular Consortium Phase 2; PoC Release 2.0; http://www.motorola.com/content/0,,2647-4398,00.html; cover letter.

(Continued)

*Primary Examiner* — Hai Nguyen
(74) *Attorney, Agent, or Firm* — Schiff Hardin LLP

(57) ABSTRACT

A conference condition file is used to check whether at least one stored conference condition is met, which indicates a condition regarding a participant's setup of and/or participation in the telecommunication conference. If at least one condition is met then the conference is set up or the participant is added to the conference.

13 Claims, 8 Drawing Sheets

U.S. PATENT DOCUMENTS

| | | | |
|---|---|---|---|
| 6,978,293 B1* | 12/2005 | Wong et al. | 709/206 |
| 6,996,411 B2* | 2/2006 | Urata et al. | 455/500 |
| 7,003,290 B1* | 2/2006 | Salonaho et al. | 455/423 |
| 7,020,098 B2* | 3/2006 | Ehrsam et al. | 370/260 |
| 7,027,577 B2* | 4/2006 | Gourraud et al. | 379/202.01 |
| 7,046,779 B2* | 5/2006 | Hesse | 379/202.01 |
| 7,061,901 B1* | 6/2006 | Shnitzer et al. | 370/352 |
| 7,062,533 B2* | 6/2006 | Brown et al. | 709/205 |
| 7,069,446 B2* | 6/2006 | Wiederin et al. | 713/189 |
| 7,072,941 B2* | 7/2006 | Griffin et al. | 709/204 |
| 7,106,849 B2* | 9/2006 | Baratz et al. | 379/221.08 |
| 7,127,685 B2* | 10/2006 | Canfield et al. | 715/842 |
| 7,130,884 B2* | 10/2006 | Maehiro | 709/206 |
| 7,139,813 B1* | 11/2006 | Wallenius | 709/219 |
| 7,151,753 B2* | 12/2006 | Chaney et al. | 370/261 |
| 7,155,248 B2* | 12/2006 | Idnani | 455/519 |
| 7,171,228 B2* | 1/2007 | Florkey et al. | 455/519 |
| 7,177,905 B1* | 2/2007 | Slutsman et al. | 709/204 |
| 7,184,415 B2* | 2/2007 | Chaney et al. | 370/260 |
| 7,190,960 B2* | 3/2007 | Wilson et al. | 455/456.1 |
| 7,200,396 B2* | 4/2007 | Kauppinen | 455/435.3 |
| 7,277,697 B2* | 10/2007 | Desai et al. | 455/416 |
| 7,281,215 B1* | 10/2007 | Canfield et al. | 715/752 |
| 7,284,207 B2* | 10/2007 | Canfield et al. | 715/842 |
| 7,312,809 B2* | 12/2007 | Bain et al. | 348/14.05 |
| 7,317,695 B2* | 1/2008 | Mayer et al. | 370/261 |
| 7,330,541 B1* | 2/2008 | Surazski et al. | 379/202.01 |
| 7,359,724 B2* | 4/2008 | Torvinen | 455/518 |
| 7,418,090 B2* | 8/2008 | Reding et al. | 379/202.01 |
| 7,421,661 B1* | 9/2008 | Canfield et al. | 715/752 |
| 7,444,160 B1* | 10/2008 | Fournier et al. | 455/518 |
| 7,460,493 B1* | 12/2008 | Dhanoa et al. | 370/260 |
| 7,477,281 B2* | 1/2009 | Chandra et al. | 348/14.09 |
| 7,486,735 B2* | 2/2009 | Dubuc et al. | 375/260 |
| 7,496,352 B2* | 2/2009 | Kaminsky et al. | 455/412.2 |
| 7,499,701 B2* | 3/2009 | Salonaho et al. | 455/423 |
| 7,512,114 B2* | 3/2009 | Laturell | 370/352 |
| 7,526,312 B2* | 4/2009 | Martin | 455/552.1 |
| 7,542,756 B2* | 6/2009 | Mason et al. | 455/416 |
| 7,552,175 B2* | 6/2009 | Luo et al. | 709/205 |
| 7,573,837 B1* | 8/2009 | Mangal et al. | 370/260 |
| 7,594,010 B2* | 9/2009 | Dohler et al. | 709/224 |
| 7,680,093 B2* | 3/2010 | Duan et al. | 370/342 |
| 7,697,943 B2* | 4/2010 | Jung | 455/456.3 |
| 7,769,620 B1* | 8/2010 | Fernandez et al. | 705/14.49 |
| 7,840,681 B2* | 11/2010 | Acharya et al. | 709/227 |
| 7,924,771 B2* | 4/2011 | Hsu et al. | 370/328 |
| 7,953,803 B2* | 5/2011 | Hayes, Jr. | 709/206 |
| 7,962,852 B2* | 6/2011 | Tagami et al. | 715/733 |
| 7,966,404 B2* | 6/2011 | Hedin et al. | 709/227 |
| 8,015,246 B1* | 9/2011 | Anderson | 709/204 |
| 8,019,363 B2* | 9/2011 | Robinson et al. | 455/466 |
| 8,036,174 B2* | 10/2011 | Park et al. | 370/331 |
| 8,170,607 B2* | 5/2012 | Martin | 455/552.1 |
| 8,204,910 B2* | 6/2012 | Tedesco et al. | 707/785 |
| 8,219,622 B2* | 7/2012 | Sandin et al. | 709/206 |
| 8,254,346 B2* | 8/2012 | Karaoguz et al. | 370/338 |
| 2002/0007455 A1* | 1/2002 | Wiederin et al. | 713/162 |
| 2002/0174248 A1* | 11/2002 | Morriss | 709/238 |
| 2003/0014292 A1* | 1/2003 | Strubbe et al. | 705/8 |
| 2003/0044654 A1* | 3/2003 | Holt | 429/13 |
| 2003/0108000 A1* | 6/2003 | Chaney et al. | 370/260 |
| 2003/0108002 A1* | 6/2003 | Chaney et al. | 370/261 |
| 2003/0122677 A1* | 7/2003 | Kail, IV | 340/573.1 |
| 2003/0129962 A1* | 7/2003 | Chaney | 455/406 |
| 2003/0153339 A1 | 8/2003 | Crockett et al. | |
| 2003/0156697 A1* | 8/2003 | Svercek | 379/202.01 |
| 2003/0174826 A1 | 9/2003 | Hesse | |
| 2003/0176178 A1* | 9/2003 | Urata et al. | 455/334 |
| 2003/0185232 A1* | 10/2003 | Moore et al. | 370/465 |
| 2003/0187641 A1* | 10/2003 | Moore et al. | 704/235 |
| 2003/0187800 A1* | 10/2003 | Moore et al. | 705/52 |
| 2004/0003041 A1* | 1/2004 | Moore et al. | 709/204 |
| 2004/0006648 A9* | 1/2004 | Kita et al. | 709/250 |
| 2004/0030355 A1* | 2/2004 | Schiller et al. | 607/5 |
| 2004/0030750 A1* | 2/2004 | Moore et al. | 709/204 |
| 2004/0037407 A1* | 2/2004 | Gourraud et al. | 379/202.01 |
| 2004/0064567 A1* | 4/2004 | Doss et al. | 709/228 |
| 2004/0080610 A1* | 4/2004 | James et al. | 348/14.09 |
| 2004/0117239 A1* | 6/2004 | Mittal et al. | 705/10 |
| 2004/0131025 A1* | 7/2004 | Dohler et al. | 370/328 |
| 2004/0141606 A1 | 7/2004 | Torvinen | |
| 2004/0146048 A1* | 7/2004 | Cotte | 370/352 |
| 2004/0148340 A1* | 7/2004 | Cotte | 709/203 |
| 2004/0148341 A1* | 7/2004 | Cotte | 709/203 |
| 2004/0148342 A1* | 7/2004 | Cotte | 709/203 |
| 2004/0148351 A1* | 7/2004 | Cotte | 709/205 |
| 2004/0148392 A1* | 7/2004 | Cotte | 709/225 |
| 2004/0190468 A1* | 9/2004 | Saijonmaa | 370/312 |
| 2004/0190640 A1* | 9/2004 | Dubuc et al. | 375/260 |
| 2004/0190702 A1* | 9/2004 | Mayer et al. | 379/202.01 |
| 2004/0199580 A1 | 10/2004 | Zhakov et al. | |
| 2004/0203903 A1* | 10/2004 | Wilson et al. | 455/456.1 |
| 2004/0205212 A1 | 10/2004 | Huotari et al. | |
| 2004/0208303 A1* | 10/2004 | Rajagopalan et al. | 379/202.01 |
| 2004/0253965 A1* | 12/2004 | Sato et al. | 455/456.3 |
| 2004/0266408 A1* | 12/2004 | Maes | 455/414.1 |
| 2005/0007965 A1* | 1/2005 | Hagen et al. | 370/260 |
| 2005/0010573 A1* | 1/2005 | Garg | 707/10 |
| 2005/0034079 A1* | 2/2005 | Gunasekar et al. | 715/753 |
| 2005/0043037 A1* | 2/2005 | Ioppe et al. | 455/456.1 |
| 2005/0053214 A1* | 3/2005 | Reding et al. | 379/202.01 |
| 2005/0054361 A1* | 3/2005 | Turcanu et al. | 455/518 |
| 2005/0058125 A1* | 3/2005 | Mutikainen et al. | 370/354 |
| 2005/0091674 A1* | 4/2005 | Knight et al. | 719/332 |
| 2005/0105511 A1* | 5/2005 | Poikselka | 370/352 |
| 2005/0111650 A1* | 5/2005 | Baratz et al. | 379/221.08 |
| 2005/0113123 A1* | 5/2005 | Torvinen | 455/519 |
| 2005/0141471 A1* | 6/2005 | Virtanen et al. | 370/342 |
| 2005/0141541 A1* | 6/2005 | Cuny et al. | 370/437 |
| 2005/0153729 A1* | 7/2005 | Logan et al. | 455/550.1 |
| 2005/0232173 A1* | 10/2005 | Gunasekar et al. | 370/282 |
| 2005/0260988 A1* | 11/2005 | Kauppinen | 455/435.3 |
| 2005/0267936 A1* | 12/2005 | Poikselka | 709/204 |
| 2005/0272455 A1* | 12/2005 | Oommen | 455/518 |
| 2005/0283447 A1* | 12/2005 | Xu et al. | 705/400 |
| 2006/0010197 A1* | 1/2006 | Ovenden | 709/204 |
| 2006/0019655 A1* | 1/2006 | Peacock | 455/426.1 |
| 2006/0026288 A1* | 2/2006 | Acharya et al. | 709/227 |
| 2006/0045061 A1* | 3/2006 | Duan et al. | 370/342 |
| 2006/0077929 A1* | 4/2006 | Park | 370/329 |
| 2006/0084456 A1* | 4/2006 | Dunko et al. | 455/519 |
| 2006/0095515 A1* | 5/2006 | Forstadius | 709/205 |
| 2006/0128411 A1* | 6/2006 | Turcanu | 455/518 |
| 2006/0168089 A1* | 7/2006 | Sampson | 709/207 |
| 2006/0177034 A1* | 8/2006 | Reding et al. | 379/211.02 |
| 2007/0037605 A1* | 2/2007 | Logan | 455/567 |
| 2007/0053326 A1* | 3/2007 | Ala-Luukko | 370/335 |
| 2007/0142073 A1* | 6/2007 | Idnani | 455/518 |
| 2007/0162773 A1* | 7/2007 | Krantz et al. | 713/300 |
| 2007/0197261 A1* | 8/2007 | Humbel | 455/558 |
| 2007/0202844 A1* | 8/2007 | Wilson et al. | 455/404.2 |
| 2007/0217411 A1* | 9/2007 | Danzeisen et al. | 370/389 |
| 2007/0232274 A1* | 10/2007 | Jung et al. | 455/412.1 |
| 2007/0232284 A1* | 10/2007 | Mason et al. | 455/416 |
| 2007/0254605 A1* | 11/2007 | Zhao et al. | 455/90.2 |
| 2007/0254642 A1* | 11/2007 | Suotula | 455/422.1 |
| 2008/0004043 A1* | 1/2008 | Wilson et al. | 455/456.3 |
| 2008/0015872 A1* | 1/2008 | Schueler | 705/1 |
| 2008/0081618 A1* | 4/2008 | Krantz et al. | 455/434 |
| 2008/0096597 A1* | 4/2008 | Vempati et al. | 455/518 |
| 2008/0104517 A1* | 5/2008 | Horvitz | 715/733 |
| 2008/0136908 A1* | 6/2008 | Carter | 348/143 |
| 2008/0154707 A1* | 6/2008 | Mittal et al. | 705/10 |
| 2008/0159503 A1* | 7/2008 | Helbling et al. | 379/142.17 |
| 2008/0288643 A1* | 11/2008 | Suotula et al. | 709/227 |
| 2008/0316998 A1* | 12/2008 | Procopio et al. | 370/352 |
| 2009/0011766 A1* | 1/2009 | Ohtani et al. | 455/437 |
| 2009/0197619 A1* | 8/2009 | Colligan et al. | 455/456.3 |
| 2009/0245241 A1* | 10/2009 | Martin | 370/360 |
| 2009/0254971 A1* | 10/2009 | Herz et al. | 726/1 |
| 2009/0281676 A1* | 11/2009 | Beavis et al. | 700/295 |
| 2010/0035593 A1* | 2/2010 | Franco et al. | 455/416 |
| 2012/0136980 A1* | 5/2012 | Godfrey et al. | 709/223 |
| 2012/0164998 A1* | 6/2012 | Mousseau et al. | 455/416 |
| 2012/0290722 A1* | 11/2012 | Karaoguz et al. | 709/224 |

OTHER PUBLICATIONS

List Management and Do-not-Disturb V2.0.6 (Jun. 2004) *Technical Specification*;; Push to Talk over Cellular (PoC0; List Management and Do-not-Disturb; PoC Release 2.0.

Signaling Flows (UNI) V 2.0.6 (Jun. 2004) *Technical Specification*; Push-To-Talk over Cellular (PoC); Signaling Flows—UE to Network Interface (UNI); PoC Release 2.0.

Signaling, Flows (NNI) V 2.0.7 (Jun. 2004) *Technical Specification*; Push-To-Talk over Cellular (PoC); Signaling Flows—Network to Network interface (NNI); PoC Release 2.0.

(E)GPRS/UMTS Specification V2.0.4 (Jun. 2004) Technical Specification; Push-to-Talk over Cellular (PoC) User Plane; (E)GPRS/UMTS Specification; PoC Release 2.0.

Rosenberg, et al.; Network Working Group, Request for Comments: 3261; "SIP: Session Initiation Protocol"; pp. 1-236.

Schulzrinne, et al.; Network Working Group, Request for Comments: 3550; "RTP: A Transport Protocol for Real-Time Application", pp. 1-111.

Rosenberg, et al.; SIPPING Internet-Draft; "A Session Initiation Protocol (SIP) Event Package for Conference State", pp. 1-21.

A.B. Roach; Network Working Group, Request for Comments: 3265; "Session Initiation Protocol (SIP)-Specific Event Notification", pp. 1-34.

J. Rosenberg; Network Working Group, Request for Comments: 3311; "The Session Initiation Protocol (SIP) Update Method"; pp. 1-12.

S. Donovan; Network Working Group, Request for Comments: 2976; The SIP Info Method.

Network Working Group, Request for Comments: 2327; "SDP: Session Description Protocol"; pp. 1-45.

Campbell, et al.; Network Working Group, Request for Comments: 3428; "Session Initiation Protocol (SIP) Extension for Instant Messaging"; pp. 1-16.

J. Rosenberg; "A Framework for Conferencing with the Session Initiaion Protocol"; SIP Internet-Draft, IETF SIPPING working group; Draft-ietf-sipping-conferencing-framework-02, Jun. 2004.

Push-To-Talk over Cellular Consortium Phase 2; PoC Release 2.0; http://www.motorola.com/content/0.,2647-4398,00.html; cover letter, Jun. 2003.

Architecture V2.0.8. (Jun. 2004) *Technial Specification*; Push-to-talk over Cellular (PoC); Architecture; PoC Release 2.0.

User Requirements V2.0.6 (Jun. 2004) *Technical Specification*; Push-to-talk over Cellular (PoC); User Requirements; PoC Release 2.0.

List Management and Do-not-Disturb V2.0.6 (Jun. 2004) *Technical Specification*;; Push to Talk over Cellular (PoCO; List Management and Do-not-Disturb; Poe Release 2.0.

Presence Service V2.0.9 (Jun. 2004) *Technical Specification*; Push-to-talk over Cellular (PoC); Presence Service; PoC Release 2.0.

Signaling Flows (UNI) V 2.0.6 (Jun. 2004) *Technical Specification*; Push-To-Talk over Cellular (PoC); Signaling Flows- UE to Network Interface (UNI); PoC Release 2.0.

Signaling Flows (NNI) V 2.0.7 (Jun. 2004) *Technical Specification*; Push-To-Talk over Cellular (PoC); Signaling Flows—Network to Network interface (NNI); PoC Release 2.0.

Transport Protocols V2.0.6 (Jun. 2004) *Technical Specification*; Push-to-Talk over Cellular (PoC) User Plane; Transport Protocols; PoC Release 2.0.

(E)GPRS/UMTS Specification V2.0.4 (Jun. 2004) *Technical Specification*; Push-to-Talk over Cellular (PoC) User Plane; (E)GPRS/UMTS Specification; Poe Release 2.0.

UE Provisioning V2.0.7 (Jun. 2004) *Technical Specification*; Push-to-talk over Cellular (PoC); Ue Provisioning; PoC Release 2.0.

Rosenberg, et al.; Network Working Group, Request for Comments: 3261; "SIP: Session Initiation Protocol"; pp. 1-236, Jun. 2002.

Schulzrinne, et al.; Network Working Group, Request for Comments: 3550; "RTP: A Transport Protocol for Real-Time Application", pp. 1-111, Jul. 2003.

Rosenberg, et al.; SIPPING Internet-Draft; "A Session Initiation Protocol (SIP) Event Package for Conference State", pp. 1-21, May 2004.

A.B. Roach; Network Working Group, Request for Comments: 3265; "Session Initiation Protocol (SIP)-Specific Event Notification", pp. 1-34, Jun. 2002.

J. Rosenberg; Network Working Group, Request for Comments: 3311;"The Session Initiation Protocol (SIP) Update Method"; pp. 1-12, Sep. 2002.

S. Donovan; Network Working Group, Request for Comments: 2976; "The SIP INFO Method", Oct. 2000.

Network Working Group, Request for Comments: 2327; "SOP: Session Description Protocol"; pp. 1-45, 1998.

Campbell, et al.; Network Working Group, Request for Comments: 3428; "Session Initiation Protocol (SIP) Extension for Instant Messaging"; pp. 1-16, Dec. 2002.

J. Rosenberg; "A Framework for Conferencing with the Session Initiation Protocol"; SIP Internet-Draft, IETF SIPPING working group; Draft-ietf-sipping-conferencing-framework-02, Jun. 2004.

Khartabil et al.; The Conference Policy Control Protocol (CPCP); XCON, Internet Draft, IETF XCON Working Group: Draft IETF-XCON-CPCP-XCAP-01, Jul. 2004.

\* cited by examiner

US 8,428,634 B2

METHOD FOR AUTOMATICALLY SETTING UP AND/OR CONTROLLING A TELECOMMUNICATION CONFERENCE

CROSS-REFERENCE TO RELATED APPLICATION

This application claims priority to German Patent Application Serial No. 10 2004 053 597.3-31, which was filed on Nov. 5, 2004.

FIELD OF THE INVENTION

The invention relates to a method for automatically setting up and/or controlling a telecommunication conference with a multiplicity of participants, to a telecommunication conference terminal and to a telecommunication conference server device.

BACKGROUND OF THE INVENTION

The service called Push-to-Talk over Cellular (PoC) allows a user or sender to select one or more recipients and then, when he has pressed a special Push-to-Talk over Cellular key (PoC key), to transmit
  speech
  to a plurality of recipients simultaneously
  using the half-duplex method, i.e. only the sender can
    speak and the recipients cannot interrupt him while he is
    speaking.
With this service, the voice data are usually already being distributed over the telecommunication network while the sender is speaking. This is also called "streaming". Thus, from the point of view of the user, Push-to-Talk over Cellular is similar to conventional CB radio, but with the extension that the sender is able to speak to recipients throughout the world who are able to be reached using the communications engineering of at least one telecommunication conference network, preferably a mobile radio telecommunication conference network. However, one prerequisite is that these recipients are also registered in the telecommunication network at the time at which the telecommunication link is set up, and in the case of a mobile radio communication network this means that they are registered, in other words that they are "online".

Push-to-Talk over Cellular has been specified in a first version in an industrial consortium and is described in Push-to-Talk over Cellular (PoC); PoC Release 2.0. Further activities take place in the Open Mobile Alliance (OMA) and 3rd Generation Partnership Project (3GPP) standardization committee.

Push-to-Talk over Cellular is implemented in the "packet switched domain" (PS domain, i.e. in the packet-switched domain of the telecommunication network; the communication network protocol used on the network layer level is the Internet Protocol (IP)).

For every Push-to-Talk over Cellular group session there is a central Push-to-Talk over Cellular server device, known as the controlling PoC server. During a PoC group session, the PoC client devices are linked to the controlling PoC server via a respective "participating server" associated with them. By way of example, the signaling communication link between a PoC client and a participating PoC server or between a participating PoC server and a controlling PoC server uses the IP Multimedia Subsystem (IMS), which uses the "Session Initiation Protocol" (SIP) as signaling communication protocol, as described in RFC 3261 "SIP: Session Initiation Protocol".

The data transmission communication link between the PoC client and the participating PoC server or between the participating PoC server and the controlling PoC server uses the "Transport Protocol for Real Time Applications" (RTP).

Push-to-Talk currently has three different types of PoC groups (Push-to-Talk over Cellular groups), which are distinguished essentially by the structure of the PoC group session:
  Ad-hoc PoC Group Session:
  Before an ad-hoc PoC group session is set up, the initiator of the ad-hoc PoC group session defines a list of PoC users, including their address, for example their telephone number, as an SIP-URL (Session Initiation Protocol Unique Resource Locator) or an SIP address as an SIP-URL.
  In this connection, it should be noted that the list of PoC users may also comprise just one person. The list is included in the dispatch from the initiating PoC client to the controlling PoC server when the ad-hoc PoC group session is set up, and the controlling PoC server then invites all the PoC users contained in the list to join the ad-hoc PoC group session. Invited PoC users may accept, turn down or else ignore this invitation.
  Prearranged PoC Group Session:
  If one recurrently wishes to conduct a PoC group session with the same PoC users, a PoC user is able to define his own personal, fixed groups and to notify the controlling PoC of them. These are the "prearranged PoC groups".
  By way of example, a PoC user can define his own prearranged PoC group "friends" with the appropriate PoC users, including their address, for example a telephone number SIP-URL or an SIP address as an SIP-URL.
  The prearranged PoC group is then allocated a dedicated group address, for example an SIP-URL. This group address is included in the dispatch from the initiating PoC client to the controlling PoC server when the prearranged PoC group session is set up, and the controlling PoC server then invites all the PoC users belonging to the prearranged PoC group to join this prearranged PoC group session. Invited PoC users may accept, turn down or else ignore this invitation.
  Chat PoC Group Session:
  Chat PoC groups are likewise firmly defined, known to the controlling PoC server and relate, by way of example, to a particular topic of discussion. With this type of PoC group, there is generally provision for a PoC user who is authorized to do so to dial into a chat PoC group session himself and then to be able to conduct a PoC group session with the other PoC users who are likewise taking part in this chat PoC group session as PoC participants. This group session thus works in a similar manner to the provision made in a "chat room" on the Internet.

With Push-to-Talk over Cellular, there are thus two different options for a PoC user to be able to become a PoC participant in a PoC group session. Either he dials into a PoC group session (which is the usual way in the case of a chat PoC group session) or he accepts an invitation (which is the usual way in the case of an ad-hoc PoC group session or in the case of a prearranged PoC group session).

Internet Draft "A Session Initiation Protocol (SIP) Event Package for Conference State" discloses a "Session Status Notification" service, as a service feature (Feature) of Push-to-Talk over Cellular, which is used to inform a PoC user of the current status of the PoC group session. Such a status may include, by way of example, who is currently a PoC participant in the PoC group session. When a PoC user registers for such a service, he is thus aware at any time of how many and which PoC participants are currently taking part in a PoC group session. This optional service feature is implemented by the SIP extension SUBSCRIBE/NOTIFY, as described in RFC 3265 "Session Initiation Protocol (SIP)-Specific Event Notification".

If a PoC user wishes to take part in a discussion in a particular chat PoC group session, this PoC user may wish to take part only under certain conditions. By way of example, the PoC user may wish to take part in this chat PoC group session only if at least three people are already taking part in it, since he is of the opinion that the discussion cannot be of interest otherwise.

To be able to guarantee that such a condition is observed, the PoC user might register for the afore-mentioned service feature "Session Status Notification" and constantly, i.e. continuously, observe the current status regarding the chat PoC session of interest.

As soon as he establishes from the Session Status Notification messages transmitted to him that the condition which he himself has set, that is to say in this example that at least three PoC participants are already taking part in the PoC group session of interest, is met he does himself enter the appropriate chat PoC group session.

A different scenario is conceivable with an ad-hoc PoC group session or with a prearranged PoC group session.

When the PoC user is invited to join such an ad-hoc PoC group session or a prearranged PoC group session, he might turn down the invitation at first because a condition which he has chosen and which he himself has set, for example that his boss should also already be taking part in this PoC group session, is not met. In that case, he subsequently observes the status of this PoC group session of interest, for example likewise by registering for the service feature "Session Status Notification", and dials into this PoC group session too as soon as his boss is also taking part as a PoC participant in the PoC group session of interest.

One particular drawback of the two scenarios described above is that the PoC user himself must constantly observe the current status of a particular PoC group session and cannot request that he join a respective PoC group session which is of interest to him until the condition which he has set is met. Another drawback of the practices described above is that if the condition is never met then the user has wasted a large amount of time and energy in constantly observing the status of the corresponding PoC group session. It is also possible on the basis of the practices described above that, although the condition is met, the fact that the user has not noticed that the condition is met until at a late time, means that he does not join the PoC group session until later or even until too late, and hence might not obtain information of interest to him which is distributed or interchanged in the PoC group session.

RFC 3311 "The Session Initiation Protocol (SIP) UPDATE Method" describes an SIP message UPDATE and RFC 2976 "The SIP INFO Method" describes an SIP message INFO.

RFC 2327 "SDP: Session Description Protocol" discloses the "Session Description Protocol" (SDP).

RFRC 3428 "Session Initiation Protocol (SIP) Extension for Instant Messaging" describes the SIP message MESSAGE.

The problems described above also arise in other telecommunication conferences, for example a telecommunication conference system on the Internet, which has been described in J. Rosenberg, A framework for conferencing with the session initiation protocol, SIP Internet-Draft, IETF SIPPING working group: Draft-IETF-SIPPING-conferencing-framework-02, June, 2004, for example and is called "conferencing framework". On the basis of this telecommunication conference system, the standardization committee 3GPP also specifies the service IMS Conferencing.

Besides a method for controlling the access rights to multimedia telecommunication conference resources (also called floor control) and setting up conference rules (also called conference policy) the telecommunication conference system described in J. Rosenberg, A framework for conferencing with the session initiation protocol, SIP Internet-Draft, IETF SIPPING working group: Draft-IETF-SIPPING-conferencing-framework-02, June, 2004, also provides Session Initiation Protocol (SIP)-based procedures, inter alia for setting up, managing, entering and leaving telecommunication conferences. This system also contains methods for notifying the conference participants (also called Conference Notification Service) about specific information and events relating to the telecommunication conference. One of these notification methods is the aforementioned "Session Status Notification", for example. Within the telecommunication conference system, it is possible to interchange any types of media between the participants, and for this reason the telecommunication conference system is subsequently also referred to as a multimedia telecommunication conference system.

To define different rules, the multimedia telecommunication conference system described in J. Rosenberg, A framework for conferencing with the session initiation protocol, SIP Internet-Draft, IETF SIPPING working group: Draft-IETF-SIPPING-conferencing-framework-02, June, 2004, defines the "Conference Policy Control Protocol" (CPCP), as described in H. Khartabil et al., The Conference Policy Control Protocol (CPCP), XCON, Internet Draft, IETF XCON Working Group: Draft IETF-XCON-CPCP-XCAP-01, July 2004.

US 2003/0153339 A1 describes a method in which a user sends a server a list of participants with the request to provide a conference involving the participants specified by the list of participants. In this case, the server checks, in particular, whether a conference involving the participants is already in existence and, if appropriate, adds the user to the conference retrospectively.

US 2004/0205212 A1 describes a method for forwarding service-related information to a network user. In this case, a terminal belonging to the network user requests event packets, and the network user is then informed about service configurations, for example.

US 2004/0199580 A1 describes a system for managing a conference in which a client application is used to configure a conference, a server unit manages the conference settings and configures a conference unit, so that the conference unit provides the conference at the scheduled time.

SUMMARY OF THE INVENTION

A method for automatically setting up and/or controlling a telecommunication conference with a plurality of participants, where an electronic conference condition file stores at least one user-defined conference condition for setting up the telecommunication conference and/or for participation by one or more participants in the telecommunication conference. The method includes the steps of using the conference condition file to check whether at least one stored conference condition is met, and if at least one stored conference condition is met, then setting up the telecommunication conference and/or adding the participant(s) to the telecommunication conference.

A telecommunication conference terminal including a telecommunication conference unit, a memory, a telecommunication conference checking unit, and a telecommunication conference message generator unit. The telecommunication conference unit is set up to communicate with other telecommunication conference terminals and/or with a telecommunication conference server device in a telecommunication conference. The memory stores an electronic conference condition file, which contains at least one user-defined conference condition for setting up the telecommunication conference and/or for participation by one or more participants in the telecommunication conference. The telecommunication conference checking unit is coupled to the memory and is set up to use the conference condition file to check whether at least one stored conference condition is met. The telecommunication conference message generator unit is set up such that if the telecommunication conference message generator unit receives from the telecommunication conference checking unit a piece of information indicating that at least one stored conference condition is met, then the telecommunication conference message generator unit generates a conference setup request message, which is used to request that a telecommunication conference be set up, or a conference joining message, which is used to notify that the telecommunication conference terminal is joining the telecommunication conference.

A telecommunication conference server device including a telecommunication conference unit, a memory, a telecommunication conference checking unit, and a telecommunication conference setup/control unit. The telecommunication conference unit is set up to communicate with telecommunication conference terminals and/or with one or more other telecommunication conference server devices in a telecommunication conference. The memory stores an electronic conference condition file which contains at least one user-defined conference condition for setting up the telecommunication conference and/or for participation by one or more participants in the telecommunication conference. The telecommunication conference checking unit is coupled to the memory and is set up to use the conference condition file to check whether at least one stored conference condition is met. The telecommunication conference setup/control unit is set up such that if at least one stored conference condition is met, then the telecommunication conference setup/control unit sets up the telecommunication conference and/or adds a participant or a plurality of participants to the telecommunication conference.

BRIEF DESCRIPTION OF THE DRAWINGS

Exemplary embodiments of the invention are illustrated in the figures and are explained in more detail below. In the figures, identical or similar elements have normally been provided with the same reference symbols.

DETAILED DESCRIPTION OF PREFERRED EMBODIMENTS OF THE INVENTION

The invention is based on the problem of setting up and/or controlling a telecommunication conference while taking account of user-specific conditions in a manner which is simple for a user.

The problem is solved by a method for automatically setting up and/or controlling a telecommunication conference with a multiplicity of participants, a telecommunication conference terminal and a telecommunication conference server device having the features based on the independent patent claims.

Preferred refinements of the invention can be found in the dependent claims. The refinements of the invention which are described below relate both to the method for automatically setting up and/or controlling a telecommunication conference and to the telecommunication conference server device and the telecommunication conference terminal.

In a method for automatically setting up and/or controlling a telecommunication conference with a multiplicity of participants, where an electronic conference condition file stores at least one conference condition for setting up the telecommunication conference and/or for participation by one or more participants in the telecommunication conference, the conference condition file is used for automatically checking whether at least one stored conference condition is met. If at least one stored conference condition is met, the telecommunication conference is set up and/or the participant or the participants is/are added to the telecommunication conference.

If no stored conference condition is met, provision may be made for different actions, for example the conference might not be set up, a conference might be continued unchanged, a user who has requested that he join a conference might be informed about the condition not being met, for example using an appropriate notification message, or the users might be informed about the possibility of a set condition being met when one or more prescribable actions are performed.

Figure 7:
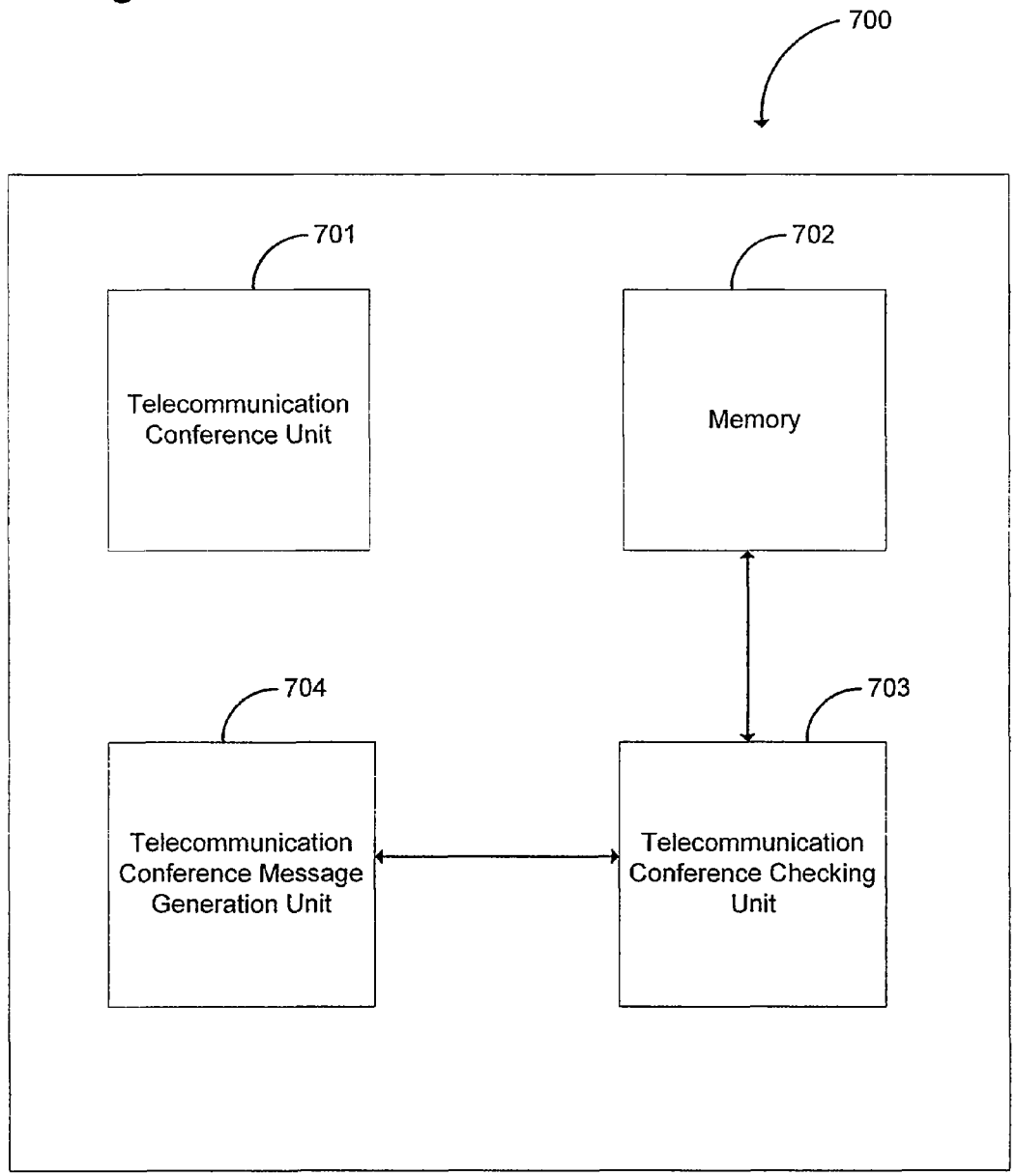
FIG. 7 illustrates a telecommunication conference terminal based on an exemplary embodiment of the invention.

FIG. 7 illustrates a telecommunication conference terminal 700, which has a telecommunication conference unit 701 which is set up to communicate with other telecommunication conference terminals and/or with a telecommunication server device in a telecommunication conference. In addition, it has a memory 702 for storing an electronic conference condition file which contains at least one conference condition for setting up the telecommunication conference and/or for participation by one or more participants in the telecommunication conference. In addition, a telecommunication conference checking unit 703 coupled to the memory is provided which is set up to use the conference condition file, preferably the data contained in the conference condition file, to check whether at least one stored conference condition is met. A telecommunication conference message generation unit 704 which is likewise provided in the telecommunication conference terminal is set up such that if it receives from the telecommunication conference checking unit a piece of information indicating that at least one stored conference condition is met then it generates one of the following messages:

a conference setup request message which is used to request that a telecommunication conference be set up, and/or a conference joining message which is used to notify that the telecommunication conference terminal is joining the telecommunication conference.

Figure 8:
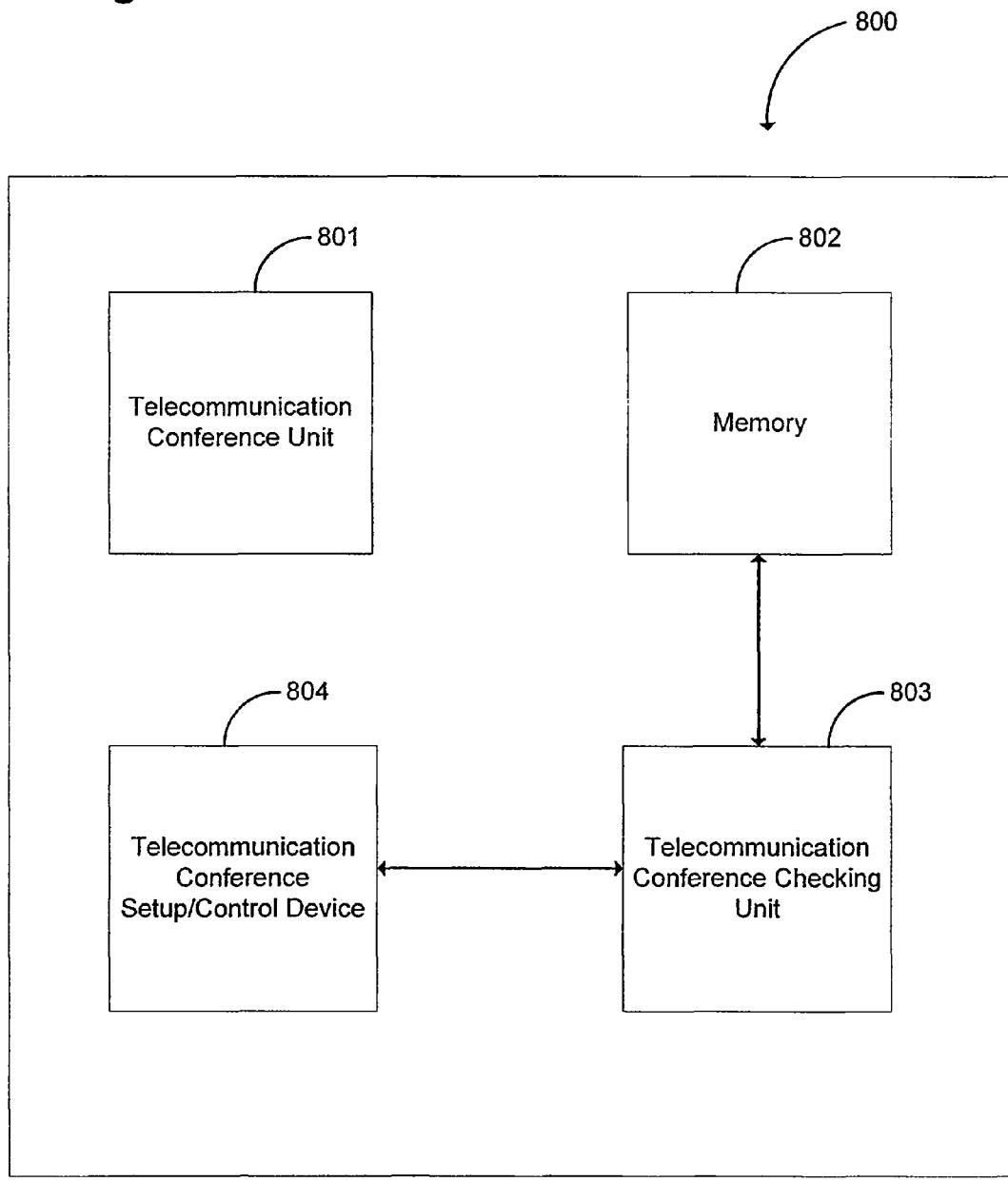
FIG. 8 illustrates a telecommunication conference server device based on an exemplary embodiment of the invention.

FIG. 8 illustrates a telecommunication conference server device 800, which has a telecommunication conference unit 801 which is set up to communicate with the telecommunication conference terminals and/or with one or more different telecommunication conference server devices in a telecommunication conference. In addition, it has a memory 802 for storing an electronic conference condition file which contains at least one conference condition for setting up the telecommunication conference and/or for participation by one or more participants in the telecommunication conference. The memory has a telecommunication conference checking unit 803 coupled to it which is set up to use the content of the conference condition file, particularly (a) conference condition(s) stored in the conference condition file, to check whether at least one of the conference condition(s) stored in it is/are met. There is also provided a telecommunication conference setup/control device 804 which is set up such that if at least one stored conference condition is met then it sets up the telecommunication conference and/or adds a participant or a plurality of participants to the telecommunication conference.

The participants in the telecommunication conference transmit and/or receive data preferably using a mobile radio communication system, particularly preferably based on a 3GPP mobile radio communication system, particularly preferably based on UMTS.

In other words, this means that the telecommunication conference server device is preferably set up for telecommunication using a mobile radio system, in this case particularly preferably on the basis of a 3GPP mobile radio system, and in this case especially preferably on the basis of UMTS.

The invention is thus particularly suitable for use in a, preferably cell-based, mobile radio communication system. In other words, this means that the telecommunication conference server device is thus preferably part of a mobile radio communication system, particularly preferably a 3GPP mobile radio communication system, and in this case particularly preferably the "IP Multimedia Core Network Subsystem" (IMS) in the UMTS mobile radio communication system.

Depending on the architecture of the telecommunication conference network, the telecommunication conference server device may also be integrated in a telecommunication conference terminal.

In addition, in the case of a fully meshed telecommunication conference exclusively using telecommunication conference terminals, one telecommunication conference terminal among these can "subscribe" to a telecommunication conference server device and can activate and provide the corresponding functionality/functionalities.

In this connection, it should be pointed out that in this description "setting up a telecommunication conference" is also intended to be understood to mean inviting a participant to set up a telecommunication conference, i.e. asking a future possible telecommunication conference participant to set up the telecommunication conference.

In addition, the expression "controlling a telecommunication conference" is also to be understood within the context of this invention to mean inviting a possible new participant to join a telecommunication conference which has already been set up.

The individual functional units described below may each be implemented in individual separate hardware units, for example standalone computers or telecommunication terminals, preferably mobile radio terminals, or may be implemented at least partly in software, i.e. by means of computer programs implemented in separate or joint computer units.

The invention is particularly suitable for use in a multimedia telecommunication conference, i.e. in a telecommunication conference in which different types of media, for example audio data, video data and/or text data, are interchanged and transmitted between the participants in the telecommunication conference.

Preferably, the method is used in a landline telecommunication conference, particularly an Internet-based landline telecommunication conference, alternatively preferably in a mobile radio telecommunication conference, particularly a cell-based mobile radio telecommunication conference, and in this case particularly preferably in a 3GPP mobile radio telecommunication conference, particularly in a UMTS mobile radio telecommunication conference.

One particularly preferred field of use is a Push-to-Talk over Cellular mobile radio telecommunication conference, particularly one of the following types:

Ad-hoc mobile radio telecommunication conference;
Prearranged mobile radio telecommunication conference;
Chat mobile radio telecommunication conference.

Particularly a Push-to-Talk over Cellular mobile radio telecommunication conference gives rise to the problems described in the introduction to the description regarding continuous manual observation of an existing telecommunication conference for conditions which may or may not have been met.

The invention clearly describes new mechanisms for telecommunication conference sessions, particularly for PoC group sessions, which are used to incorporate a conference user, for example a PoC user, into a telecommunication group session, particularly a PoC group session, as a participant only when a particular event which this user has defined has occurred.

By way of example, a conference user, for example a PoC user, is not incorporated into a chat PoC group session as a participant until at least two further PoC participants are already taking part in this chat PoC group session.

The invention thus makes it possible, in the first place, for conditions for joining a telecommunication conference to be automatically transmitted to an appropriate unit for setting up or controlling a telecommunication conference, by which they can be processed in automatable fashion and checked continuously. Alternatively, the check can also take place in the telecommunication terminal, and the user can be informed about the condition being met in the telecommunication conference simultaneously or in real time without the user constantly having to monitor the status of the telecommunication conference of interest manually himself. The invention also ensures that the user can join or set up the telecommunication conference in real time, i.e. more or less immediately after the telecommunication conference's condition has been met. This avoids unnecessary loss of time for a user's participation in the telecommunication conference.

This significantly increases the user-friendliness of a telecommunication conference system for the users.

The conference condition file may be stored in a participant terminal belonging to a participant.

In this case, it is preferred for status information about the telecommunication conference to be transmitted to a participant terminal storing the respective conference condition file and for the check to be performed by the participant terminal using the status information received.

This refinement of the invention achieves automated monitoring of the telecommunication conference by the terminal and, beyond real-time information for the user about the prescribed condition being met, also setup and/or control of a telecommunication conference.

In line with one refinement of the invention, the status information about the telecommunication conference is transmitted to a participant terminal when a prescribed event occurs, for example using the service "Session Status Notification", as described in Internet Draft "A Session Initiation Protocol (SIP) Event Package for Conference State". In this case, it is preferable to transmit the status information about the telecommunication conference to a participant terminal when a change of status in the telecommunication conference occurs, for example when a participant joins or leaves the telecommunication conference.

Alternatively, the telecommunication conference condition file may be stored in a telecommunication conference server device.

In this case, provision is preferably made for a check to be performed for a plurality of telecommunication conference requests received from the telecommunication conference server device to determine whether meeting the telecommunication conference requests meets the conference condition of a user. If meeting the telecommunication conference requests does meet the conference condition then the telecommunication conference is set up and/or the participant or participants is/are added to the telecommunication conference.

This means that even if isolated consideration of an appropriate request condition were to reveal that said condition were not inherently met for an existing or not yet existing telecommunication conference then it is a centralized possibility for processing or analysis and evaluation of a plurality of requests and a plurality of conditions from different participants to allow the respective conditions to be met for all participants when a telecommunication conference is set up.

This significantly increases convenience for the user even further.

The conference condition taken into account is preferably one or more of the following conference conditions:
- a prescribed number, particularly a minimum number or a maximum number, of participants with an interest or taking part in a telecommunication conference;
- an identity for participants with an interest or taking part in a telecommunication conference;
- a time at which a telecommunication conference is set up;
- a time at which a telecommunication conference is terminated;
- a duration for a telecommunication conference;
- the content of a telecommunication conference;
- the communication intensity in a telecommunication conference, particularly the proportion of time spent talking and/or the frequency with which the person authorized to speak changes.

Figure 1:
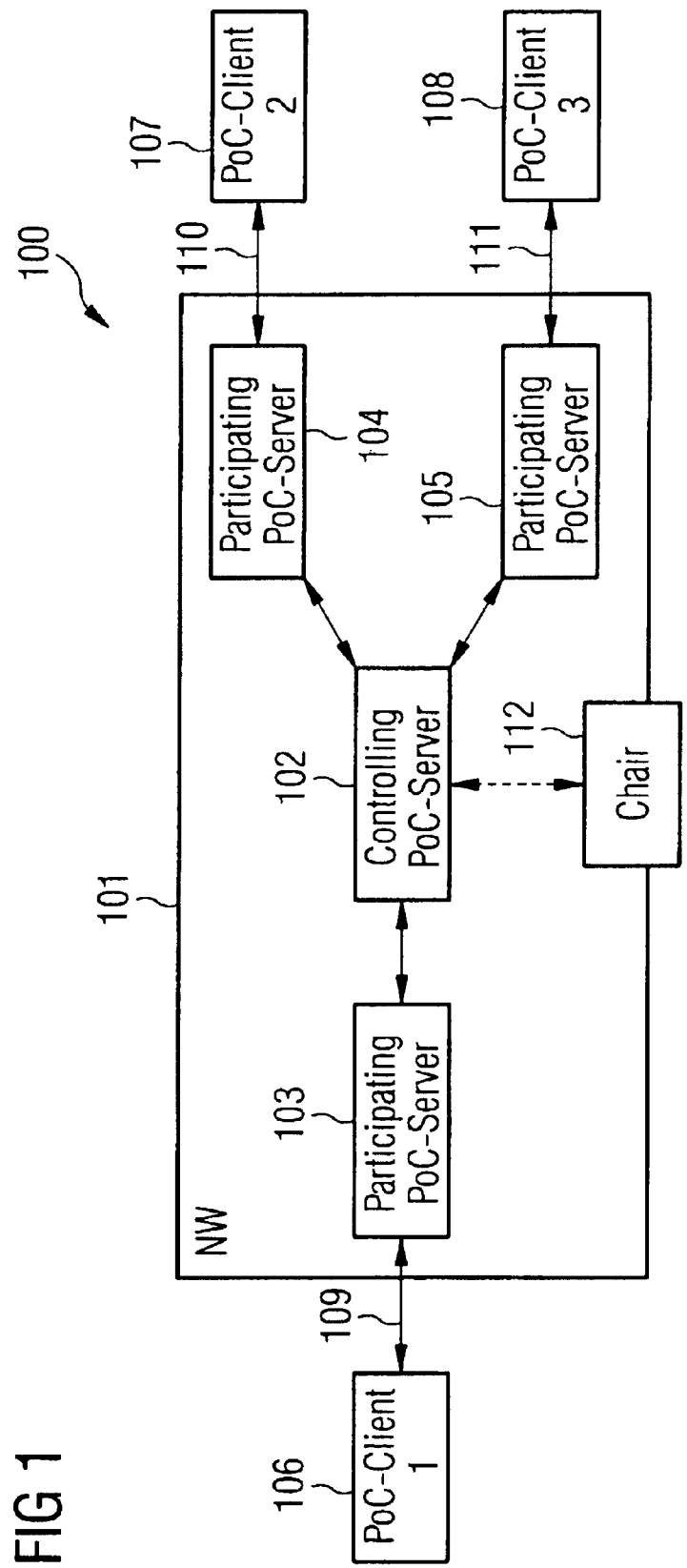
FIG. 1 shows a block diagram showing the Push-to-Talk over Cellular communication system based on the exemplary embodiments for the Push-to-Talk over Cellular communication system.

FIG. 1 shows the basic architecture of a Push-to-Talk over Cellular mobile radio telecommunication conference system 100 based on a plurality of exemplary embodiments of the invention.

Push-to-Talk over Cellular is implemented in the packet-switched domain (PS domain), i.e. in the packet-switched part of a mobile radio communication system.

The communication network protocol used for Push-to-Talk over Cellular at the level of the network layer is the Internet protocol (IP).

On the network, the communication system 100 has a central PoC server device, known as the controlling PoC server 102, for every PoC group session (Push-to-Talk over Cellular group session), i.e. for every group communication link in a PoC conference, in a landline network domain 101.

In addition, for every PoC communication terminal, for every PoC client, a respective participating PoC server device (participating PoC server) 103, 104, 105 associated with this PoC client is provided and associated therewith. The PoC clients, preferably mobile radio terminals, in which the corresponding communication protocols and programs for PoC-based communication are implemented, are denoted in FIG. 1 by the reference symbols 106, 107 and 108. In line with these exemplary embodiments of the invention, the signaling communication link between a respective PoC client 106, 107, 108 and the respective participating PoC server 103, 104 or 105 and the controlling PoC server 102 uses the Internet Protocol Multimedia Subsystem (IMS), which uses the Session Initiation Protocol (SIP) as signaling communication protocol, as described in RFC 3261 "SIP: Session Initiation Protocol".

The Push-to-Talk over Cellular mobile radio telecommunication conference system 100 is set up in line with Push-to-Talk over Cellular (PoC); PoC Release 2.0, apart from the additional features, as are explained in more detail below.

The data transmission communication link between the PoC clients 106, 107, 108 and the respective participating PoC servers 103, 104 and 105 or the Controlling PoC server 102 uses the protocol RTP in line with RFC 3550 "RTP: A Transport Protocol for Real-Time Applications".

Push-to-Talk currently has three different types of PoC groups (Push-to-Talk over Cellular groups), which are distinguished essentially by the structure of the PoC group session:

Ad-hoc PoC Group Session:
Before an ad-hoc PoC group session is set up, the initiator of the ad-hoc PoC group session defines a list of PoC users, including their address, for example their telephone number, as an SIP-URL (Session Initiation Protocol Unique Resource Locator) or an SIP address as an SIP-URL.

In this connection, it should be noted that the list of PoC users may also comprise just one person. The list is included in the dispatch from the initiating PoC client to the controlling PoC server when the ad-hoc PoC group session is set up, and the controlling PoC server then invites all the PoC users contained in the list, i.e. all the listed PoC users, to join the ad-hoc PoC group session. Invited PoC users may accept, turn down or else ignore this invitation.

Prearranged PoC Group Session:
If one recurrently wishes to conduct a PoC group session with the same PoC users, a PoC user is able to define his own personal, fixed groups and to notify the controlling PoC of them. These are the "prearranged PoC groups".

By way of example, a PoC user can define his own prearranged PoC group "friends" with the appropriate PoC users, including their address, for example a telephone number SIP-URL or an SIP address as an SIP-URL.

The prearranged PoC group is then allocated a dedicated group address, for example an SIP-URL. This group address is included in the dispatch from the initiating PoC client to the controlling PoC server when the prearranged PoC group session is set up, and the controlling PoC server then invites all the PoC users belonging to the prearranged PoC group to join this prearranged PoC group session. Invited PoC users may accept, turn down or else ignore this invitation.

Chat PoC Group Session:
Chat PoC groups are likewise firmly defined, known to the controlling PoC server and relate, by way of example, to a particular topic of discussion. In this case, every PoC user who is authorized to do so can dial into a chat PoC group session himself and can then conduct a PoC group session with the other PoC users who are likewise taking part in this chat PoC group session as PoC participants. This group session thus works in a similar manner to the provision made in a "chat room" on the Internet.

PoC clients 106, 107, 108 thus have a respective interface, preferably an air interface 109, 110, 111 for providing a mobile radio communication link to their respective participating PoC server 103, 104 or 105, which in turn have a communication link to the central controlling PoC server 102.

In addition, there is optionally a floor control decision unit (chair) 112 which is coupled to the controlling PoC server 102. The chair 112 is a logic unit which is provided for the extended service feature "floor control decision via chair". The chair 112 may be implemented in a PoC client 106, 107, 108 itself or else in a server in the network domain 101.

The interface from the PoC client 106, 107, 108 to the respective participating PoC server 103, 104 or 105 may be implemented in the UMTS, for example, using the Radio Access Network (RAN), the Core Network (CN) and the IP Multimedia Subsystem (IMS). Other implementations, for example using an ordinary Post communication network (PSTN), are likewise provided in an alternative embodiment.

The invention provides essentially two different approaches to solutions for the problems described above, these approaches being described in more detail, particularly in connection with the Push-to-Talk over Cellular mobile radio telecommunication conference system 100, where a common feature of all the exemplary embodiments described below is that conditions described below are automatically checked by a terminal or by a server device.

All the subsequently described approaches to solutions may, in principle, be applied to all the above-described types of PoC group sessions.

The text below therefore frequently refers generally to PoC group sessions and no longer distinguishes between the three different types of PoC group sessions.

In this case, the exemplary embodiments described can be applied to all three PoC group sessions described above.

In line with a first approach to a solution, the "Session Status Notification" service described above is used.

In the respective PoC client 106, 107, 108 (or in an application, i.e. an application program, implemented on the PoC terminal which receives the required information from the PoC client 106), the PoC user can define one or more or else a combination of several conditions which need to be met before he can dial into a prescribed particular PoC group session.

The prescribed conditions are stored in a conference condition file which is accessible to the PoC client 106, 107, 108.

The PoC client 106, 107, 108 uses the conference condition file to check, for every reported change in the status of the corresponding PoC group session, with which the respective conference condition file is associated, whether this/these condition(s) is/are met.

As soon as this is the case, the PoC client 106, 107, 108 automatically dials into the respective PoC group session and provides the PoC user with appropriate advice of this, for example by outputting a signal tone or appropriate advice on the display of the PoC terminal.

The advantage of the first approach to a solution is particularly that the PoC user does not himself constantly need to observe the status of the corresponding PoC group session, but rather that the PoC client 106, 107, 108 contains an appropriate mechanism which behaves in line with the wishes of the PoC user and automatically monitors the respective PoC group session on a continuous basis.

In line with a second approach to a solution, the inventive functionality is, by contrast, implemented primarily in the controlling PoC server 102.

The PoC user "conditionally", i.e. by setting an appropriate dial-in condition, dials into a particular PoC group session, and, in line with the invention, additionally sends one, a plurality of or a combination of several conditions to the controlling PoC server 102 with the dial-in message.

If said condition(s) is/are met, the PoC user is immediately made into a PoC participant in the respective group session by the controlling PoC server 102.

If the condition(s) is/are not met, the PoC user is stored in a possible-participant file (possible-participant list) in the controlling PoC server 102 and is managed by the latter as a potential PoC participant, i.e. the potential PoC participant is sent no voice messages from this PoC group session (if it is actually in progress) and is also not able to introduce voice messages into the PoC voice session himself. The controlling PoC server 102 now constantly, i.e. continuously, or alternatively at prescribed intervals of time, checks whether this/these condition(s) which has/have been prescribed by the respective client is/are met.

As soon as this is the case the potential PoC participant is automatically incorporated into the PoC group session and thus becomes an entirely "normal" PoC participant. This is done through appropriate signaling from the controlling PoC server 102 through to the appropriate PoC client 106, 107, 108.

In line with the second approach to a solution, the following additional advantages are obtained, in particular:

In line with the second approach to a solution, it is not absolutely necessary for the PoC client 106, 107, 108 to use the "Session Status Notification" service, generally a service which informs the client about a change of status in a PoC group session. This saves additional (possibly even very frequent) signaling of the status of the respective PoC group session, which saves both resources via the air interface and charges incurred for the PoC user.

Since the functionality is provided primarily in the controlling PoC server 102, it can be implemented once centrally and does not need to be present or implemented on each individual PoC client 106, 107, 108. It is thus also a very simple and inexpensive matter to handle maintenance, i.e. particularly an update to the appropriate software.

The controlling PoC server 102 always knows who and how many PoC users apply as potential PoC participants in a particular PoC group session. This allows mutually dependent conditions to be resolved by various potential PoC participants.

One exemplary instance is that a particular chat PoC group currently contains no participants, but three PoC users dial in with the condition that at least two other PoC participants are taking part in this chat PoC session. Since the controlling PoC server 102 knows all the conditions of the three potential PoC participants, it can dial all three potential PoC participants into the chat PoC session, which means that all the conditions are then also met.

One variant of the second approach to a solution, as has been described above, is that the PoC user can store information in the landline communication network regarding the conditions on which he would like to be invited to join a particular PoC group session. It is also possible to define conditions for a group of PoC group sessions or else for all future PoC group sessions to which the PoC user is invited.

The additional advantage in such a variant is particularly that no further signaling would be required, since the conditions would not need to be additionally sent every time upon conditional dial-in or upon potential acceptance of an invitation.

The text below explains a few concepts which are used below and above, in the manner in which they are able to be understood in this description:

- A PoC user is a user of a communication terminal who has a PoC client on his telecommunication terminal and is registered with a PoC service. He is thus in principle able to conduct a PoC group session.
- A PoC participant is a PoC user who has successfully dialed into a PoC group session (he has dialed in or he has accepted an invitation), i.e. he receives all the voice data produced by the other PoC participants in this PoC group session and is generally also able to introduce voice data into the PoC group session himself.
- A potential PoC participant is a user who is just "associated" with the PoC group session, i.e. he has dialed into a PoC group session conditionally with the controlling PoC server 102 using a condition, the condition, however, currently not being met. He is thus not yet a PoC participant, but would become one as soon as the condition is met.

A first exemplary embodiment of the invention, whose structure is implemented on the basis of the first approach to a solution described above is explained in more detail with reference to a message flowchart 200 in FIG. 2.

It is assumed that a PoC user wishes to take part in the chat PoC session entitled "Michael Jackson".

However, he only wishes to take part in it if his friend "Peter" is likewise a PoC participant in this chat PoC group session; furthermore, he has time to do this only in the evening between 19:00 and 20:00.

He inputs these two conditions into an application implemented on the first PoC client 106, and the two conditions are stored in an appropriate syntax, preferably based on XML (Extensible Markup Language), in a conference condition file (not shown). In the exemplary embodiments, it is assumed that each PoC client 106, 107, 108 is implemented in a mobile radio terminal which is set up on the basis of UMTS.

Figure 2:
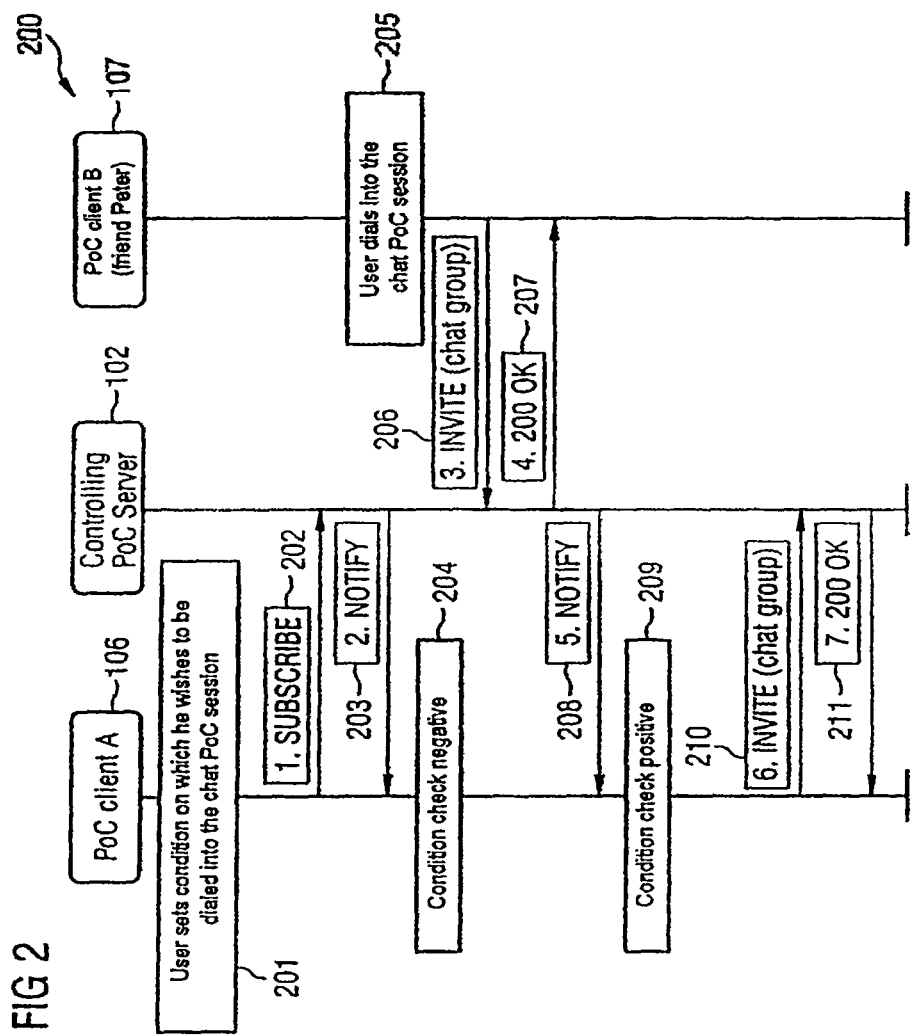
FIG. 2 shows a message flowchart showing the method steps based on a first exemplary embodiment of the invention.

The input and storage of the condition by the user in the first PoC client 106 is symbolized by a first block 201 in FIG. 2.

At 19:00, the application implemented in the first PoC client 106 prompts the first PoC client 106 to request the "Session Status Notification" service for this indicated chat PoC group from the controlling PoC server 102.

To this end, the first PoC client 106 sends an appropriate SIP-SUBSCRIBE message 202 with the "Conference Status Event Package" to the controlling PoC server 102.

In addition, it is intended to forward all the received status information, which it receives in the form of an SIP-NOTIFY message 203 to the application in the first PoC client 106. FIG. 2 shows the exemplary instance in which, following receipt of the first SIP-NOTIFY message 203, the condition(s) is/are first of all checked (checking step 204) and the result of this check is negative, since at this time the PoC client of the PoC user "Peter" is not yet a PoC participant in the PoC group session.

At a subsequent time, the PoC user "Peter" dials into the chat PoC group session (block 205) using a first SIP-INVITE message 206 which contains, as a parameter an identifier for the respective chat group into which the second PoC client 107 wished to dial and which is sent from the second PoC client 107, which is implemented on the mobile radio terminal of the PoC user "Peter", to the controlling PoC server 102.

The controlling PoC server 102 sets up the desired chat group session or adds the PoC user "Peter" to the desired chat group session which has already been set up, and confirms this to the second PoC client 107, which sent the request for the set up of or participation in the PoC group session, using a first SIP-200-OK message 207.

On account of the change of status in the telecommunication conferences or in the PoC group sessions, the controlling PoC server 102 sends the subscribed PoC client 106 a second SIP-NOTIFY message 208, which contains the information that the friend "Peter" has "joined" the chat PoC session as a participant.

On the basis of this new information, the first PoC client 106 now uses the conference condition file and the second SIP-NOTIFY message 208 to check whether the condition is met (checking step 209), and, since the condition is now met on the basis of the assumptions above, the first PoC client 106 generates and sends a second SIP-INVITE message 210 with the identification statement for the chat group and sends it to the controlling PoC server 102.

The controlling PoC server 102 adds the first PoC client 106 to the chat group session indicated in the SIP-INVITE message 210 and confirms this to the first PoC client 106, using a second SIP-200-OK message 211.

Both the first client 106 and the second client 107 are now PoC participants in the desired PoC group session.

Figure 3:
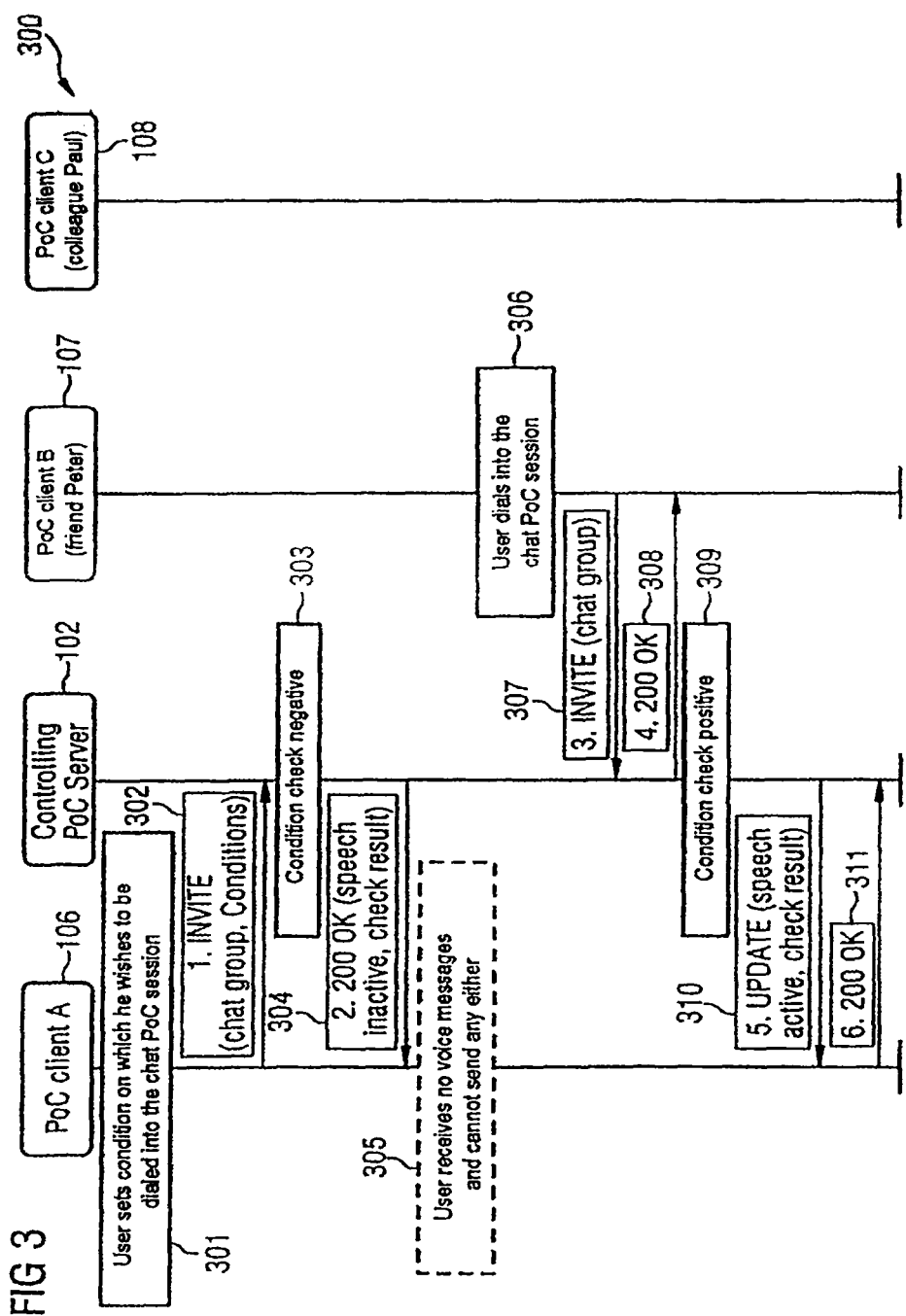
FIG. 3 shows a message flowchart showing the method steps based on a first implementation alternative for a second exemplary embodiment of the invention.
Figure 4:
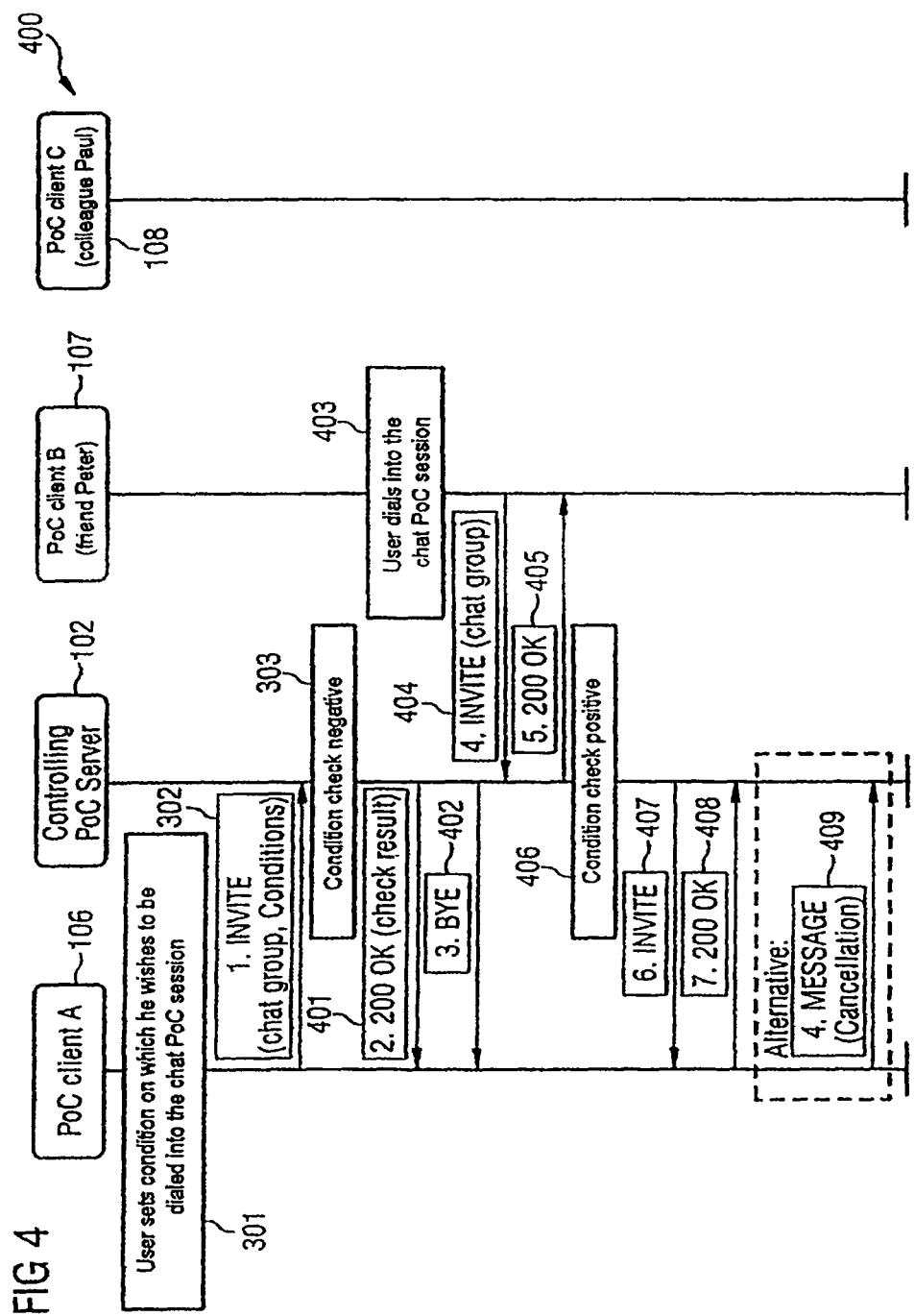
FIG. 4 shows a message flowchart showing the method steps based on a second implementation alternative for the second exemplary embodiment of the invention.

FIG. 3 and FIG. 4 show two different implementation alternatives to a second exemplary embodiment of the invention based on the second approach to a solution described above.

In line with this second exemplary embodiment it is assumed that a PoC user wishes to take part in a chat PoC group session whose subject is "Michael Jackson".

However, he wishes to take part in it only if his friend "Peter" or his colleague "Paul" is likewise a PoC participant in this PoC group session.

He inputs these conditions in an application, implemented on his mobile radio terminal, on which the first PoC client 106 is also implemented, and thus starts his conditional dial-in into the corresponding chat PoC group session (block 301).

The first PoC client 106 then sends a first SIP-INVITE message 302, which contains, as parameters, the statement indicating the chat PoC group session and the conditions which the PoC user has input, i.e. has set. The first SIP-INVITE message 302 is transferred from the first PoC client 106 to the controlling PoC server 102, which enters the received conditions in a conference condition file stored in a memory in the controlling PoC server 102.

The text below illustrates an exemplary structure for the SIP-INVITE message 302 based on this exemplary embodiment of the invitation in XML format.

---

INVITE sip:minhael.jackson@ptt.umts.de SIP/2.0
...
Content-Type: application/dial_in_conditions+xml
Content-Length: (...)
<dial_in_conditions>
   <conditions_or>

```
        <poc_user uri="sip:my.friend.peter@umts.de"
        participant="true">
        <poc_user uri "sip:my.colleague.paul@umts.de"
        participant="true"/>
    </conditions_or>
</dial_in_conditions>
```

The information representing the set conditions, which is additional in comparison with an ordinary INVITE message based on SIP, is highlighted in bold in the XML example above.

Following receipt of the first SIP-INVITE message 302, the controlling PoC server 102 checks whether the condition that the PoC user "sip:my.friend.peter@umts.de" or the PoC user "sip:my.colleague.paul@umts.de" is currently a PoC participant in the corresponding PoC group session, which is indicated by the parameter "chat group" in the SIP-INVITE message 302, is met.

In the exemplary instance that the friend Peter is currently taking part in the PoC group session, the controlling PoC server 102 sends a first SIP-200-OK message 303 to the first PoC client 106, with the SIP-200-OK message 303 being extended as illustrated below (the extension is marked in bold), as a result of which the PoC user becomes a PoC participant:

```
200 sip:poc.user@infineon.com SIP/2.0
...
Content-type: application/dial_in_conditions_status+xml
Content-length: (...)
    <dial_in_conditions_status>
    <conditions_or>
        <poc_user uri="sip:my.friend.peter@umts.de"
        participant="true"/>
        <poc_user uri "sip:my.colleague.paul@umts.de"
        participant="false"/>
    </conditions_or>
</dial_in_conditions_status>
```

The above extension can be used to notify the PoC user of what condition(s) was/were the basis for this actual dial-in into the chat PoC group session. This is of particular interest when logic ORing of the PoC user is performed, as illustrated in the example above.

If neither the friend, "Peter" nor the colleague "Paul" is currently taking part in the PoC group session, there are two alternative implementations, i.e. procedures.

The first implementation alternative (cf. FIG. 3) involves the controlling PoC server 102 generating a first SIP-200-OK message 304, and transmitting it to the first PoC client 106, if a check on the indicated conditions by the controlling PoC server 102 gives a negative result (block 303). In the first SIP-200-OK message 304, the corresponding media (particularly voice) have been set to "inactive" using the Session Description Protocol (SDP) described in RFC 2327 "SDP: Session Description Protocol", i.e. the user receives no voice messages and is also not able to send any (symbolized in FIG. 3 by block 305). Such an SDP message is designed in line with RFC 2327 "SDP: Session Description Protocol". The first SIP-200-OK message 304 thus takes the following form:

```
200 sip:poc.user@infineon.com SIP/2.0
...
Content-Type: application/sdp
Content-Length: (...)
```

```
...
m=audio 49170 RTP/AVP 0
a = inactive
Content-type: application/dial_in_conditions_status+xml
Content-length: (...)
    <dial_in_conditions_status>
    <conditions_or>
        <poc_user uri="sip:my.friend.peter@umts.de"
        participant="false"/>
        <poc_user uri "sip:my.colleague.paul@umts.de"
        participant="false"/>
    </conditions_or>
</dial_in_conditions_status>
```

The information representing the result of the check on the indicated conditions, which information is additional in comparison with an ordinary 200-OK message based on SIP, is highlighted in bold in the XML example above.

In other words, this means that the PoC user is now a potential PoC participant in this PoC group session, that is to say can neither receive nor send voice data.

If the condition which the first SIP-INVITE message 302 contains is met at a later time, the controlling PoC server 102 sends an appropriate SIP message (for example an SIP message UPDATE, as described in RFC 3311 "The Session Initiation Protocol (SIP) UPDATE Method", an SIP message INFO, as described in RFC 2976 "The SIP INFO Method", or an SIP message RE-INVITE) in which voice is then set to "active" using SDP. In this way the PoC user then becomes a "normal" PoC participant. This message too can then be extended by the result of the condition check (block 303), as described above in connection with the first SIP-200-OK message 304.

FIG. 3 gives a more detailed explanation of this procedure once again, the assumption in FIG. 3 being that, at a time following transmission of the first SIP-200-OK message 304 to the first PoC client 106, the PoC user "Peter" dials into the PoC session of interest, i.e. into the chat PoC group session whose subject is "Michael Jackson", (block 306) by virtue of the second PoC client 107, which is implemented in the mobile radio terminal of the PoC user "Peter", generating a second SIP-INVITE message 307 and transmitting it to the controlling PoC server 102. The second SIP-INVITE message 307 indicates the appropriate PoC chat group, which identifies the chat PoC group session of interest which the second PoC client 107 wishes to join as a PoC participant.

The controlling PoC server 102 adds the second PoC client 107 to the PoC group session as a participant and confirms this to the second PoC client 107 using a second SIP-200-OK message 308. This means that the second PoC client 107 and hence the PoC user "Peter" are PoC participants in the chat PoC group session.

On the basis of the change of state in the chat PoC group session "Michael Jackson", the controlling PoC server 102 again checks whether the conditions indicated in the first SIP-INVITE message 302 are met (checking step 309).

Since this is now the case, because the PoC user "Peter" has become a PoC participant in this PoC group session, the controlling PoC server 102 adds the first PoC client 106 to the chat PoC group session "Michael Jackson" as a participant, generates an SIP-UPDATE message 310 and sends this message to the first PoC client 106. The SIP-UPDATE message 310 contains an (SDP) parameter which is used to make voice "active", and this message also contains the condition check result.

The first PoC client 106, which is now likewise a PoC participant in the PoC group session, confirms receipt of the SIP-UPDATE message 310 by generating a third SIP-200-OK message 311, which it transmits to the controlling PoC server 102.

Both the first PoC client 106 and the PoC client 107 are now PoC participants in the desired PoC group session.

In line with the second implementation alternative for the second exemplary embodiment, which is illustrated in FIG. 4, a negative condition check (block 303) prompts the controlling PoC server 102 to transmit a first SIP-200-OK message 401 containing the checking result as a message parameter to the first PoC client 106 in response to the first SIP-INVITE message 302, and directly afterward, i.e. immediately afterward, to generate an SIP-BYE message 402 and likewise to transmit this message to the first PoC client 106.

As an alternative to the SIP messages 401, 402, the controlling PoC server 102 transmits an SIP error signaling message "4XX" (not shown) to the first PoC client 106. All of these SIP messages may likewise contain the result of the condition check (block 303).

This means that the controlling PoC server 102 does not even begin to set up a link at signaling level to the first PoC client 106.

Nevertheless, the controlling PoC server 102 continues to track, for the first PoC client 106, whether the conditions which the first PoC client 106 has transmitted to the controlling PoC server 102 in the first SIP-INVITE message 302, and which the controlling PoC server has stored in the conference condition file stored in the controlling PoC server 102, are being met in the meantime.

The PoC user is thus a potential PoC participant in this case too. As soon as the condition is met, the controlling PoC server 102 sends an SIP-INVITE message to the first PoC client 106 in order to add the PoC user to the desired PoC group session, this time as a "normal" PoC participant.

If the first PoC client 106 wishes to withdraw its conditional dial-in expressed in the first SIP-INVITE message 302 in the meantime (that is to say while the conditions are still not met and hence the first PoC client 106 is not taking part in the PoC group session), the first PoC client 106 can send an SIP message MESSAGE 409 as described per se in RFRC 3428 "Session Initiation Protocol (SIP) Extension for Instant Messaging", to the controlling PoC server 102, with the SIP message MESSAGE 409 containing appropriate advice.

This might be implemented in the following manner:
MESSAGE sip:michael.jackson.chat@ptt.umts.de SIP/2.0
...
Content-Type: application/conditioned_dial_in_cancellation+xml
Content-Length: 0

The information representing the request to withdraw the conditional dial-in, which information is additional in comparison with an ordinary MESSAGE message based on SIP, is highlighted in bold in the XML example above.

To give a more detailed explanation, FIG. 4 uses a message flowchart 400 to illustrate that the PoC user "Peter" dials into the indicated chat PoC group session (block 403) at a later time, i.e. after the controlling PoC server 102 has notified the first PoC client 106 that the conditions are not met. This is done by virtue of the second PoC client 107 generating a second SIP-INVITE message 404, containing the statement indicating the respective chat group, and transmitting it to the controlling PoC server 102. The controlling PoC server 102 adds the second PoC client 107 and hence the PoC user "Peter" to the indicated chat PoC group session as a PoC participant and confirms this to the second PoC client 107 using a second SIP-200-OK message 405.

On the basis of the change of state in the PoC group session "Michael Jackson", the controlling PoC server 102 again checks whether the conditions contained in the conference condition file for the respective PoC clients are now met (step 406).

In this case, the condition from the first PoC client 106 is met as a result of the PoC user "Peter" joining the chat PoC group session. This means that the controlling PoC server 102 adds, or alternatively, as illustrated in FIG. 4, invites the first PoC client 106 and hence the corresponding PoC user to the PoC group session using a third SIP-INVITE message 407, which the controlling PoC server 102 transmits to the first PoC client 106.

If the first PoC client 106 accepts the invitation, the first PoC client 106 generates a third SIP-200-OK message 408 and sends it to the controlling PoC server 102, which adds the first PoC client 106 and hence the corresponding PoC user to the PoC group session upon receipt of this message 408. This means that both the first PoC client 106 and the second PoC client 107, and hence the PoC user of the first PoC client 106 and the PoC user "Peter", are participants in the desired PoC group session.

In line with a third exemplary embodiment of the invention, which is implemented in line with the second approach to a solution (not shown in the figures) it is assumed that a particular chat PoC group session currently contains no PoC participants.

In line with this exemplary embodiment of the invention, a first PoC user uses his PoC client, on the basis of the above-described method based on the second exemplary embodiment of the invention, to dial in with the condition that at least two further PoC participants need to be taking part in the chat PoC group session. Since he would currently be the only PoC participant, however, he is thus managed by the controlling PoC server 102, only as a potential PoC participant in this chat PoC group session. The corresponding SIP-INVITE message based on this exemplary embodiment of the invention might have the following appearance:

INVITE sip:michael.jackson.chat@ptt.umts.de SIP/2.0
...
Content-Type: application/dial_in_conditions+xml
Content-Length: (...)
  < dial_in_conditions>
    <poc_user min_participant="2"/>
  </ dial_in_conditions>

The information representing the set conditions, which is additional in comparison with an ordinary INVITE message based on SIP, is highlighted in bold in the XML example above.

A second PoC user then dials conditionally into the same chat PoC group session using the same condition. He too is managed only as a potential PoC participant in this chat PoC group session, which also continues to apply to the first PoC user.

A third PoC user now dials conditionally into the same chat PoC group session using the same condition. Since the controlling PoC server 102 knows all the conditions and all the requests for the PoC group session and has them stored in its conference condition file, it checks and recognizes that for all three PoC users the condition would be met if all three PoC users were to dial into the chat PoC group session as PoC participants.

In line with this exemplary embodiment of the invention, the controlling PoC server therefore starts, on the basis of the method illustrated in the second exemplary embodiment, to add all three PoC users to the PoC group session as PoC participants.

This means that all three PoC users are PoC participants in the desired chat PoC group sessions.

In the preceding examples, mention has been made only of chat PoC groups, in which a PoC client normally dials in himself. The examples below are intended to consider the case in which a PoC client is invited to join a PoC group session (for example to join an ad-hoc PoC group session or a prearranged group session).

In line with a fourth exemplary embodiment of the invention, based on the second approach to a solution described above, a prearranged group session is defined for a workgroup which is intended to have a boss and two of his collaborators as members.

The first collaborator has a mobile radio terminal in which the first PoC client 106 is implemented, the second collaborator has a mobile radio terminal in which the second PoC client 107 is implemented, and the boss has a mobile radio terminal in which the third PoC client 108 is implemented.

Figure 5:
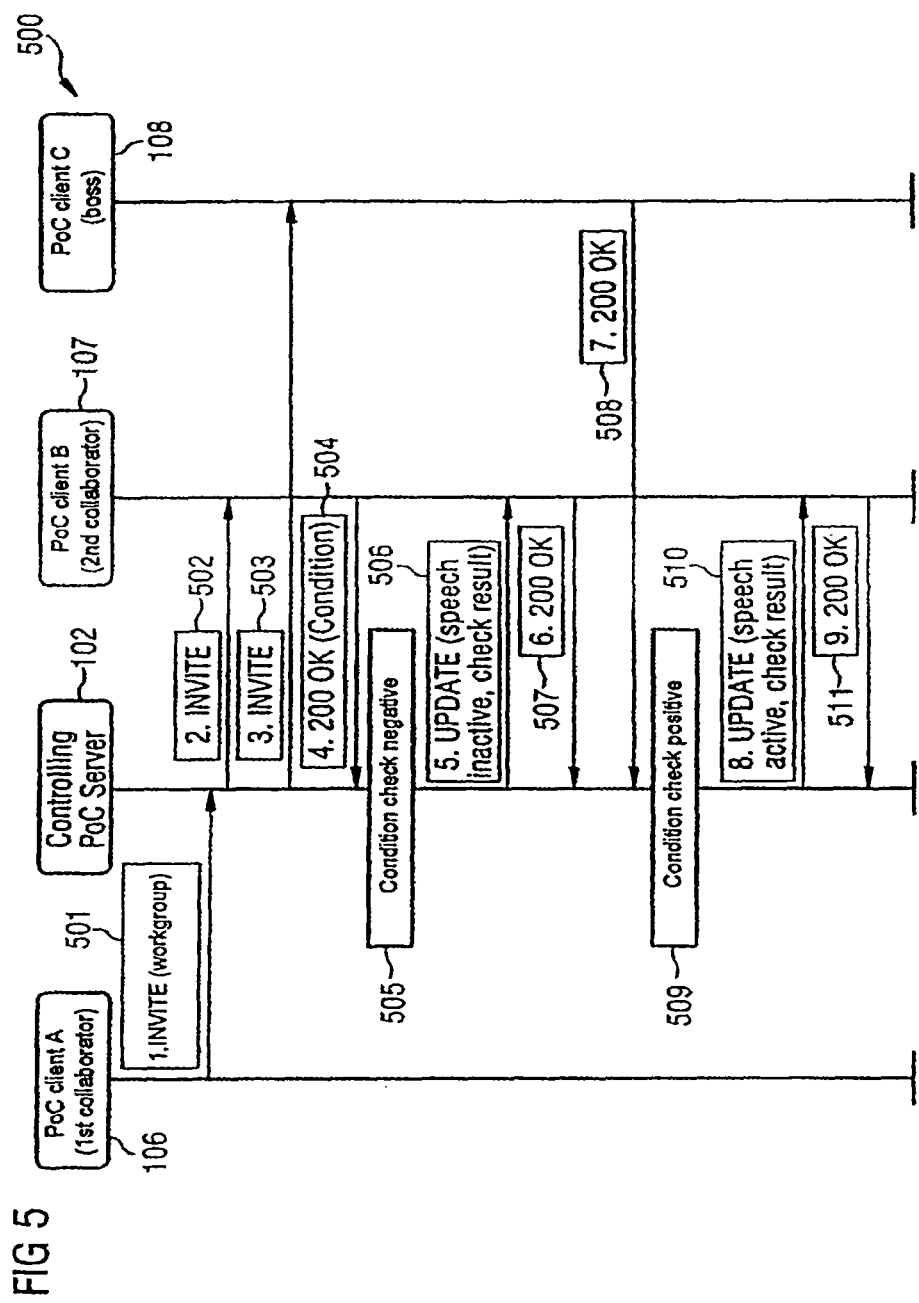
FIG. 5 shows a message flowchart showing the method steps based on a third exemplary embodiment of the invention.

The fourth exemplary embodiment is shown in a message flowchart 500 in FIG. 5.

The workgroup is defined by a workgroup identity (Group Identity) using an SIP group identity "sip:workgroup11@Infineon.com" and is thus uniquely addressable. In line with this exemplary embodiment, the first collaborator initiates a PoC group session with this group by transmitting an SIP-INVITE message 501 with the above SIP group identity of the workgroup as parameter to the controlling PoC server 102 using the first PoC client 106.

Upon receipt of the first SIP-INVITE message 501, all the other members of the workgroup, that is to say the boss and the second collaborator are now invited by the controlling PoC server 102 using a second SIP-INVITE message 502, which is transmitted to the second PoC client 107, and a second SIP-INVITE message 503, which is transmitted to the third PoC client 108. If a member of this workgroup wishes to accept this invitation to join the PoC group session, he or his PoC client 107, 108 sends an SIP-200-OK message as a response to the controlling PoC server.

In line with this exemplary embodiment, the second PoC client 107 sends a first SIP-200-OK message 504 containing a condition which describes the case where the second collaborator wishes to take part in the PoC group session only on a particular condition. In this case, the second collaborator wishes to accept the invitation to join the PoC group session only if the boss is also (already) taking part in the PoC group session as a PoC participant. He therefore adds the appropriate condition to the first SIP-200-OK message 504 in a message field provided for this purpose and sends this conditional acceptance to the controlling PoC server 102.

An example of such an SIP message in XML with the extension symbolized in bold is shown below:

```
200 sip:workgroup11@infineon.com SIP/2.0
...
Content-Type: application/accept_conditions+xml
Content-Length: (...)
    < accept_conditions>
        <poc_user uri="sip:my.chef@infineon.com" participant="true"/>
    </accept_conditions>
```

If the boss is now already a PoC participant in the PoC group session, the second participant is immediately dialed into the PoC group session as a PoC participant.

If not, which is illustrated symbolically in FIG. 5 by the checking step (block 505), a similar procedure takes place to that which has already been described in connection with the exemplary embodiment two.

There are thus also two alternative implementation options based on the fourth exemplary embodiment.

In line with a first implementation alternative, the controlling PoC server 102 sends an SIP-UPDATE message 506 to the first PoC client 107, or alternatively an SIP-INFO message or an SIP-RE-INVITE message, which it uses to set the corresponding media (particularly voice) to "inactive" using SDP. The checking result may also be contained as additional information in the SIP-UPDATE message 506 (or SIP-INFO message or SIP-RE-INVITE message).

As soon as the boss has been dialed into the PoC group session as a PoC participant, the controlling PoC server 102 again sends an SIP message, for example an SIP-UPDATE message, which it then uses to set the appropriate media (particularly voice) to "active" again using SDP. The second collaborator or the second PoC client 107 is now also considered to be a "normal" PoC participant.

FIG. 5 shows this alternative, with the second PoC client 107 generating a second SIP-200-OK message 507 upon receipt of the SIP-UPDATE message 506 and transmitting said SIP-200-OK message to the controlling PoC server 102.

It is subsequently assumed that the third PoC client 108 generates a third SIP-200-OK message 508, and transmits it to the controlling PoC server 102, when prompted by the PoC user "boss" wishing to join the PoC group session.

On the basis of the change of state in a PoC group session, the controlling PoC server 102 again checks all the conditions stored in the conference condition file for the respective PoC clients (checking step 509).

In this case, the condition of the second PoC client 107, indicated in the first SIP-200-OK message 504, is now met and the second PoC client 107 receives a second SIP-UPDATE message 510, in which the appropriate media are set to "active" using SDP. In addition, the SIP-UPDATE message 510 contains the checking result from the above checking step 509 with a positive check result.

Upon receipt of the second UPDATE message 510, the second PoC client 107 generates a fourth SIP-200-OK message 511 and transmits it to the controlling PoC server 102.

All three PoC clients 106, 107, 108 or the corresponding PoC users are now PoC participants in the PoC group session for the workgroup.

In line with a second implementation alternative for the fourth exemplary embodiment, provision is made for the controlling PoC server 102, following the negative check result, to send an SIP-BYE message, which nevertheless continues to keep conditions in mind, i.e. to check them continuously.

The second collaborator is thus considered to be a potential PoC participant.

As soon as the boss has been dialed into the PoC group session as a PoC participant, the controlling PoC server 102 then sends an SIP-INVITE message again, optionally with the result of the condition check. On account of receipt of the corresponding SIP-INVITE message, the PoC client sends the above-described inventive extended SIP-200-OK again, as a result of which the PoC client has then been dialed into the PoC group session as a PoC participant, since the condition is now met, of course.

In line with a fifth exemplary embodiment of the invention, a "Pre-established Sessions" variant provided in the OMA for the case in which the PoC user initially has just a connection to the participating PoC server 103, 104 or 105 without having been dialed into a PoC group session is used to provide for said user not to have a connection to the controlling PoC server 102 as well at any time later until he dials into a PoC group session.

In this case, all the inventive functionalities would be implemented in the participating PoC servers 103, 104, 105 instead of in the controlling PoC server 102. In addition, the respective SIP-INVITE messages would need to be replaced by a corresponding SIP-REFER message.

Figure 6:
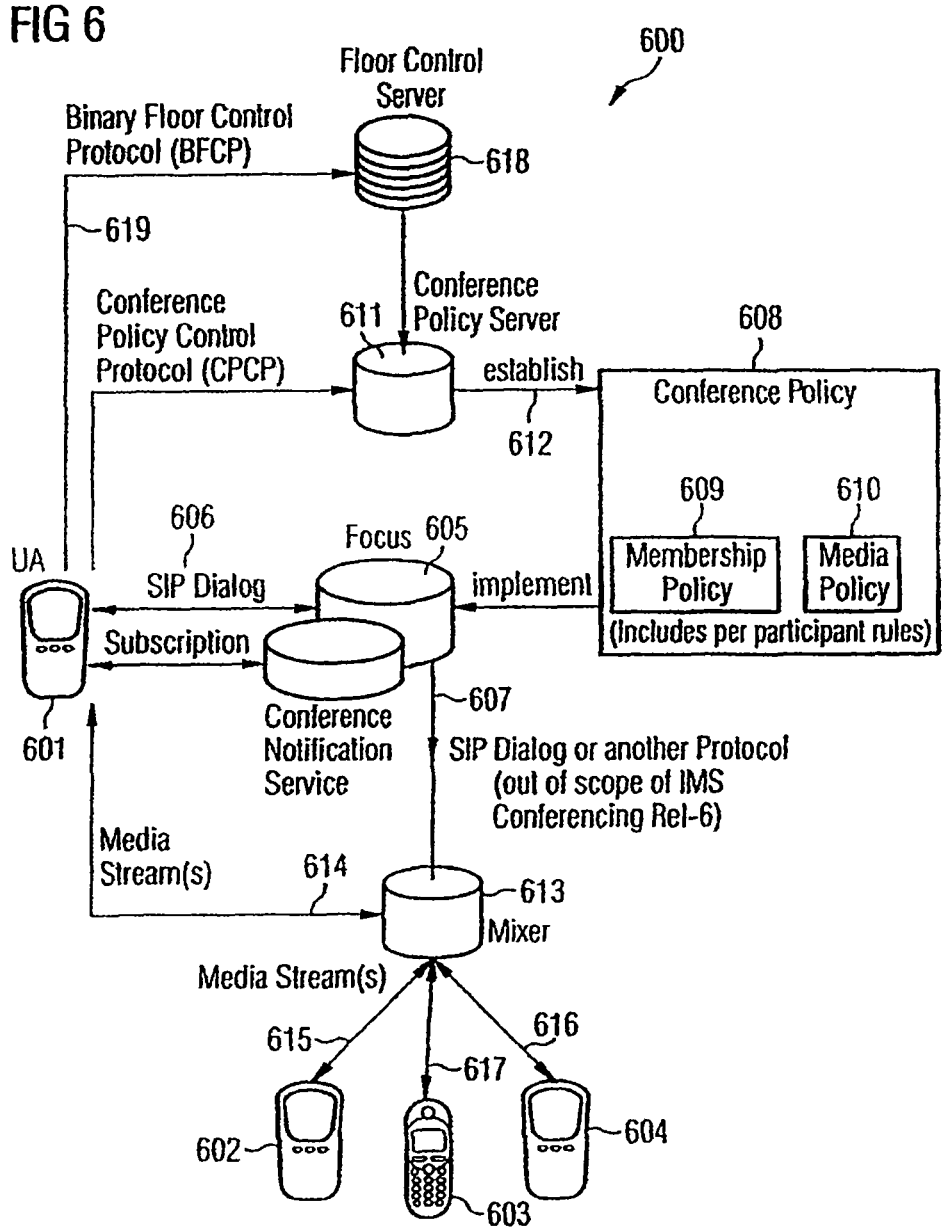
FIG. 6 shows a telecommunication conference system based on a further exemplary embodiment of the invention.

FIG. 6 shows a mobile radio multimedia telecommunication conference system 600 based on a further preferred exemplary embodiment of the invention.

It should be pointed out that in one alternative refinement it does not have to be a mobile radio multimedia telecommunication conference system.

The methods described below and above may also be implemented in a landline multimedia telecommunication conference system, for example an Internet-based landline multimedia telecommunication conference system.

In this alternative embodiment, at least some of the telecommunication terminals are set up as landline telecommunication terminals which, in particular, are set up to conduct an Internet-based telecommunication conference.

For all the exemplary embodiments which are explained in more detail below, the system 600 is identical apart from the different refinements of the focus server, which is respectively set up such that it has implemented the functionalities of the respective exemplary embodiments.

Apart from the changes described below, the communications system 600 is in a form based on the embodiments of the invention which are described in J. Rosenberg, A framework for conferencing with the session initiation protocol, SIP Internet-Draft, IETF SIPPING working group: Draft-IETF-SIPPING-conferencing-framework-02, June, 2004.

The "conferencing framework" described in J. Rosenberg, A framework for conferencing with the session initiation protocol, SIP Internet-Draft, IETF SIPPING working group: Draft-IETF-SIPPING-conferencing-framework-02, June, 2004, and illustrated in FIG. 6 provides the users, particularly the mobile radio terminals 601, 602, 603, 604, with different multimedia telecommunication conference services.

In particular, as described in detail in J. Rosenberg, A framework for conferencing with the session initiation protocol, SIP Internet-Draft, IETF SIPPING working group: Draft-IETF-SIPPING-conferencing-framework-02, June, 2004, a service for controlling the access rights to telecommunication conference resources, also called floor control, a service for setting up conference rules (which are also called conference policy control), and also, in the form of procedures based on the Session Initiation Protocol (SIP), additional services for setting up, managing, entering and leaving multimedia telecommunication conferences are provided.

In addition, the communication system 600 as likewise described in J. Rosenberg, A framework for conferencing with the session initiation protocol, SIP Internet-Draft, IETF SIPPING working group: Draft-IETF-SIPPING-conferencing-framework-02, June, 2004, provides methods for notifying the conference participants 601, 602, 603, 604, also called conference notification service, about specific information and events relating to a respective multimedia telecommunication conference. The conference system 600 is set up such that any times of media can be interchanged between the participants, i.e. between the mobile radio terminals 601, 602, 603, 604. Examples of a type of media which can be transmitted and processed in the conference system 600 are audio data, video data, instant messaging data and data from multiplayer games within a gaming conference.

FIG. 6 shows, as described above, the multimedia telecommunication conference system 600 based on the exemplary embodiments of the invention with its individual components and the interaction between the components.

The multimedia telecommunication conference system 600 has a star-shaped conference architecture in which all the conference participants (also called User Agents)—mobile radio terminals 601, 602, 603, 604 in line with this exemplary embodiment—are connected to the conference server device 605, also called the focus 605, by means of SIP signaling communication links 606. However, FIG. 6 shows one of these SIP signaling communication links 606 merely by way of example.

A respective particular mobile radio telecommunication conference which is associated with a particular conference server computer 605, i.e. with a particular focus, or is executed on it has an associated unique conference address, known as the Conference-Unique Resource Identifier (C-URI). The C-URI represents and addresses the respective conference uniquely. Inter alia, the focus 605 has indirect access to the conference policy. The conference policy file, subsequently also called the conference rule file 608, is normally logically compiled from two subregions, a membership policy 609 and a media policy 610. However, the conference policy file 608 may sometimes be stored with a physical split over a plurality of subfiles. Besides the physical separation, the conference policy file 608 may also be split logically in this context. The conference rule file 608 is generated by a conference rule server (conference policy server) 611 exclusively for a respective conference, symbolized in FIG. 6 by an arrow 612. The focus 605 is informed about the content and any change in the conference policy file by means of the conference rule server 611. It is also conceivable for the focus 605 to have direct access to the conference policy file 608.

In addition to implementing these conference rules stored in the conference rule file 608, the focus 605 has the task of ensuring that the media data streams are distributed in a manner specific to the conference.

To distribute the media data streams, the focus 605 uses what are known as mixers 613, in other words data stream mixing devices, which use the media rules stored in the media policy 610 to form the individual compilation and distribution of the media data streams over the mobile radio terminals 601, 602, 603, 604 taking part in the conference, symbolized in FIG. 6 by means of double-headed arrows 614, 615, 616, 617. The communication link between the focus 605 and the mixer 613 is symbolized by means of an arrow 607.

For the purpose of implementing the conference service, the mobile radio terminals 601, 602, 603, 604 have a few additional procedures, communication protocols and functionalities implemented in them, in particular there are new additional SIP procedures implemented and also the "Binary Floor Control Protocols" (BFCP) is implemented on the server in a floor control server 618, and the Conference Policy Control Protocol" (CPCP) or the respective units which are able to execute the corresponding communication protocols.

The Binary Floor Control Protocol communication link between a first mobile radio terminal 601 and the floor control server 618 is symbolized in FIG. 6 by means of an arrow 619.

The Conference Policy Control Protocol (CPCP) described in H. Khartabil et al., The Conference Policy Control Protocol (CPCP), XCON, Internet Draft, IETF XCON Working Group: Draft IETF-XCON-CPCP-XCAP-01, July 2004, affords the opportunity to define different rules for a multimedia telecommunication conference. Thus, by way of example, general conference rules, such as the maximum number of conference participants within the conference rule file 608 (conference policy), can be indicated using the CPCP. In addition, the conference rule file 608 contains a "dial-out" list (<dial-out-list> data element), for example which indicates which users or which telecommunication terminals are intended to be invited to join a conference when it is activated. The conference policy also contains authorization data elements which are used to indicate which user is permitted to enter other users into the "dial-out" list (<allow-modify-dol> data element).

To stipulate who is permitted to process authorization data elements, the CPCP provides a superordinate authorization data element which regulates access to all other authorization data elements (<allow-authorization-rules> data element).

The conference rule file 608 is indicated in the form of at least one XML document (Extensible Markup Language) file. On account of the user of XML to describe the conference rule file 608, it is possible to extend, in general to change, the conference rule file in a simple manner.

To transmit the XML files, i.e. particularly the conference rule file 608, or to read data from the conference rule file 608 and/or to write data to the conference rule file 608 the Hypertext Transport Protocol (HTTP) is used.

A conference rule file 608 is written or information is written to a conference rule file 608 using an HTTP PUT request, whereas a conference rule file 608 or part of a conference rule file 608 is read using an HTTP GET request, and an entire conference rule file 608 or part of the conference rule file 608 is deleted using an HTTP READ request.

In addition, the CPCP allows individual elements, attributes or attribute values of an XML document and hence of the conference rule file 608 to be addressed, in line with this exemplary embodiment of the invention, using the HTTP Unique Resource Locator (HTTP URL).

In line with this exemplary embodiment of the invention, the conference rule file 608, defined in XML, can be used to store the appropriate conditions which are transmitted by a mobile radio terminal, and the conference rule file 608 can be used to add or not to add the mobile radio terminals to a conference. The respective communication cycles can take place in similar fashion to the message flows described above.

In these exemplary embodiments too, which are based on the "conference framework" described in J. Rosenberg, A framework for conferencing with the session initiation protocol, SIP Internet-Draft, IETF SIPPING working group: Draft-IETF-SIPPING-conferencing-framework-02, June, 2004, the units which implement the check on the respective conditions may be implemented centrally in the telecommunication terminals, in the focus server, in the conference policy server or in another server device.

In summary, the following aspects of the invention may be regarded as advantageous:

The PoC user can define conditions in the PoC client, in the participating PoC server or in the controlling PoC server which need to be met before he becomes a PoC participant in a particular PoC group session.

The PoC client uses the "Session Status Notification" service to observe the current status of a PoC group session.

When the condition(s) is/are met, the PoC client automatically dials into the PoC group session, and the PoC user is accordingly informed.

The PoC client dials into a PoC group session and in so doing sends conditions to the controlling PoC server (conditional dial-in).

The PoC client is invited to join a PoC group session and in doing this sends conditions with the confirmation to the controlling PoC server (conditional acceptance).

The controlling PoC server consequently observes whether the condition(s) is/are met; as soon as this is the case, the potential PoC participant becomes the PoC participant.

The invention claimed is:

1. A method for automatically setting up and/or controlling a telecommunication conference with at least three participants, where an electronic conference condition file stores at least one user-defined conference condition, which is defined by a participant, for setting up the telecommunication conference with the at least three participants and/or for participation by one or more participants in the telecommunication conference with the at least three participants, the method comprising:
   storing the at least one user-defined electronic conference condition file in at least one of a participant terminal belonging to the participant and a telecommunication conference server device;
   using the electronic conference condition file to check, by the participant terminal, a plurality of telecommunication conference requests sent by other participants to determine whether the telecommunication conference requests sent by other participants meet the at least one user-defined conference condition; and
   if the telecommunication conference requests sent by other participants do meet the at least one user-defined conference condition, generating a conference setup request message to automatically set up the telecommunication conference with the at least three participants, or a conference joining message to automatically notify that the participant terminal is joining the telecommunication conference with the at least three participants.

2. The method as claimed in claim 1, wherein the method is used in a multimedia telecommunication conference.

3. The method as claimed in claim 1, wherein the method is used in an Internet-based landline telecommunication conference, or in a cell-based mobile radio telecommunication conference.

4. The method as claimed in claim 1, wherein the method is used in a UMTS mobile radio telecommunication conference.

5. The method as claimed in claim 1, wherein the method is used in a Push-to-Talk over Cellular mobile radio telecommunication conference of a type selected from the group consisting of an ad-hoc mobile radio telecommunication conference, a prearranged mobile radio telecommunication conference, and a chat mobile radio telecommunication conference.

6. The method as claimed in claim 1, further comprising the steps of:
   transmitting status information about the telecommunication conference to a participant terminal; and
   performing the check by the participant terminal using the received status information.

7. The method as claimed in claim 6, further comprising transmitting the status information about the telecommunication conference to the participant terminal when a prescribed event occurs.

8. The method as claimed in claim 6, further comprising transmitting the status information about the telecommunication conference to the participant terminal when a change of status in the telecommunication conference occurs.

9. The method as claimed in claim 1, wherein the plurality of telecommunication conference requests sent by other participants is received from a telecommunication conference server device.

10. The method as claimed in claim 1, wherein the at least one user-defined conference condition taken into account is one or more of the following conference conditions:
- a minimum number and/or a maximum number of participants with an interest in taking part in the telecommunication conference;
- an identity of participants with an interest in taking part in the telecommunication conference;
- a time at which the telecommunication conference is set up;
- a time at which the telecommunication conference is terminated;
- a duration of the telecommunication conference;
- content of the telecommunication conference; and
- proportion of time spent talking and/or the frequency with which a participant authorized to speak changes.

11. A telecommunication conference terminal, comprising:
- a telecommunication conference unit configured to communicate with other telecommunication conference terminals and/or with a telecommunication conference server device in a telecommunication conference with at least three participants;
- a memory configured to store an electronic conference condition file, which contains at least one user-defined conference condition, which is defined by a participant, for setting up the telecommunication conference with the at least three participants and/or for participation by one or more participants in the telecommunication conference with the at least three participants;
- a telecommunication conference checking unit which is coupled to the memory and which is configured to use the conference condition file to check a plurality of telecommunication conference requests sent by other participants to determine whether the telecommunication conference requests sent by other participants meet the at least one user-defined conference condition; and
- a telecommunication conference message generator unit which is configured such that if the telecommunication conference message generator unit receives from the telecommunication conference checking unit a piece of information indicating that the telecommunication conference requests sent by other participants do meet the at least one user-defined conference condition, then the telecommunication conference message generator unit generates a conference setup request message, which automatically requests that a telecommunication conference with the at least three participants be set up, or a conference joining message, which automatically notifies that the telecommunication conference terminal is joining the telecommunication conference with the at least three participants.

12. A computer program having a program code for performing the method for automatically setting up and/or controlling a telecommunication conference with at least three participants, where an electronic conference condition file stores at least one user-defined conference condition, which is defined by a participant, for setting up the telecommunication conference and/or for participation by one or more participants in the telecommunication conference, comprising:
- using the conference condition file to check, by a participant terminal, a plurality of telecommunication conference requests sent by other participants to determine whether the telecommunication conference requests sent by other participants meet the at least one user-defined conference condition; and
- if the telecommunication conference requests sent by other participants do meet the at least one user-defined conference condition, then automatically setting up the telecommunication conference with the at least three participants and/or automatically adding the participant(s) to the telecommunication conference with the at least three participants, when the computer program runs on a computer.

13. A telecommunication conference terminal, comprising:
- a telecommunication conference means for communicating with other telecommunication conference terminals and/or with a telecommunication conference server means in a telecommunication conference with at least three participants;
- a memory means for storing an electronic conference condition file, which contains at least one user-defined conference condition, which is defined by a participant, for setting up the telecommunication conference with the at least three participants and/or for participation by one or more participants in the telecommunication conference with the at least three participants;
- a telecommunication conference checking means, which is coupled to the memory, for using the conference condition file to check a plurality of telecommunication conference requests sent by other participants to determine whether the telecommunication conference requests sent by other participants meet the at least one user-defined conference condition; and
- a telecommunication conference message generating means, if the telecommunication conference message generating means receives from the telecommunication conference checking means a piece of information indicating that the telecommunication conference requests sent by other participants do meet the at least one user-defined conference condition, for generating a conference setup request message, which automatically requests that a telecommunication conference with the at least three participants be set up, or a conference joining message, which automatically notifies that the telecommunication conference terminal is joining the telecommunication conference with the at least three participants.

* * * * *